(12) United States Patent
Gao

(10) Patent No.: US 11,621,804 B2
(45) Date of Patent: Apr. 4, 2023

(54) METHOD OF TRANSMITTING HARQ-ACK MESSAGE, TERMINAL AND BASE STATION

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 92 days.

(21) Appl. No.: 17/044,210

(22) PCT Filed: Mar. 13, 2019

(86) PCT No.: PCT/CN2019/077996
§ 371 (c)(1),
(2) Date: Sep. 30, 2020

(87) PCT Pub. No.: WO2019/192299
PCT Pub. Date: Oct. 10, 2019

(65) Prior Publication Data
US 2021/0058197 A1 Feb. 25, 2021

(30) Foreign Application Priority Data
Apr. 4, 2018 (CN) .......................... 201810302306.0

(51) Int. Cl.
*H04W 72/12* (2009.01)
*H04L 1/1812* (2023.01)
(Continued)

(52) U.S. Cl.
CPC ......... *H04L 1/1819* (2013.01); *H04B 7/0456* (2013.01); *H04L 1/1896* (2013.01);
(Continued)

(58) Field of Classification Search
CPC ... H04B 7/0456; H04L 1/1819; H04L 1/1896; H04L 5/0055; H04L 5/0092;
(Continued)

(56) References Cited

U.S. PATENT DOCUMENTS

2009/0022183 A1   1/2009 Gollier
2013/0083753 A1   4/2013 Lee et al.
(Continued)

FOREIGN PATENT DOCUMENTS

CN   101836339 A   9/2010
CN   101895366 A   11/2010
(Continued)

OTHER PUBLICATIONS

First office action and search report from CN app. No. 201810302306.0, dated Mar. 4, 2020, with English translation from Global Dossier.
(Continued)

*Primary Examiner* — Phuc H Tran
(74) *Attorney, Agent, or Firm* — Ladas & Parry, LLP

(57) ABSTRACT

A HARQ-ACK message transmission method, a terminal and a base station are provided. The transmission method includes: when HARQ-ACK for a physical downlink channel received before BWP switching needs to be fed back after the BWP switching, determining, according to a preset rule, whether to transmit the HARQ-ACK for the physical downlink channel after the BWP switching.

12 Claims, 13 Drawing Sheets

(51) Int. Cl.
| | |
|---|---|
| *H04B 7/0456* | (2017.01) |
| *H04L 1/1867* | (2023.01) |
| *H04L 5/00* | (2006.01) |
| *H04L 5/14* | (2006.01) |
| *H04W 72/14* | (2009.01) |

(52) U.S. Cl.
CPC .......... *H04L 5/0055* (2013.01); *H04L 5/0092* (2013.01); *H04L 5/1469* (2013.01); *H04W 72/14* (2013.01)

(58) Field of Classification Search
CPC ... H04L 5/1469; H04L 1/1607; H04L 1/1664; H04L 1/1806; H04L 1/1812; H04L 1/1854; H04L 5/0007; H04L 5/0053; H04L 5/0078; H04L 5/0098
See application file for complete search history.

(56) References Cited

U.S. PATENT DOCUMENTS

| | | | |
|---|---|---|---|
| 2014/0187255 A1 | 7/2014 | Dimou et al. | |
| 2018/0034523 A1 | 2/2018 | Kim et al. | |
| 2020/0358587 A1* | 11/2020 | Wang | ................ H04W 72/1289 |
| 2021/0014008 A1* | 1/2021 | Takeda | ................ H04W 72/042 |

FOREIGN PATENT DOCUMENTS

| | | |
|---|---|---|
| CN | 105103640 A | 11/2015 |
| CN | 107493605 A | 12/2017 |
| TW | 201807988 A | 3/2018 |

OTHER PUBLICATIONS

First office action and search report from TW app. No. 108109530, dated Jan. 15, 2021, with machine English translation.
International Search Report from PCT/CN2019/077996, dated May 29, 2019, with English translation from WIPO.
Written Opinion of the International Searching Authority from PCT/CN2019/077996, dated May 29, 2019, with English translation from WIPO.
International Preliminary Report on Patentability from PCT/CN2019/077996, dated Oct. 6, 2020, with English translation from WIPO.
"Discussion on HARQ-ACK transmission due to BWP switching", R1-1802441, 3GPP TSG RAN WG1 Meeting #92, Athens Greece, Feb. 26-Mar. 2, 2018.
"DCI field interpretation when active BWP is changed", R1-1802507, 3GPP TSG RAN WG1 Meeting #92, Athens Greece, Feb. 26-Mar. 2, 2018.
Extended European Search Report from EP app. No. 19781475.9, dated Apr. 23, 2021.
"On remaining details of BWPs", R1-1800552, 3GPP TSG-RAN WG1 Meeting NR1801, Vancouver, Canada, Jan. 22-26, 2018.
"Summary of remaining issues on NR CA", R1-1801348, 3GPP TSG RAN WG1 Meeting #92, Athens, Greece, Feb. 26-Mar. 2, 2018.
Notice of Reason for Refusal from JP app. No. 2020-554140, dated Jan. 6, 2022, with English translation provided by Global Dossier, all pages.
Communication pursuant to Article 94(3) EPC from EP app. No. 19781475.9, dated Jan. 31, 2022, all pages.
Agustin et al., "Efficient Use of Paired Spectrum Bands through TDD Small Cell Deployments", IEEE Communications Magazine, Sep. 2017, pp. 210-217.
MediaTek Inc., "Remaining Details on Bandwidth Part Operation in NR", R1-1801638, 3GPP TSG RAN WG1 Meeting #92, Athens, Greece, Feb. 26-Mar. 2, 2018, all pages.
CATT, "Remaining issues on NR CA operation", R1-1803762, 3GPP TSG RAN WG1 Meeting #92bis, Sanya, China, Apr. 16-20, 2018, all pages.
CATT, "Remaining issues on HARQ-ACK codebook", R1-1806301, 3GPP TSG RAN WG1 Meeting #93, Busan, Korea, May 21-25, 2018, all pages.
First Office Action for Korean Patent Application 10-2020-7031745 issued by the Korean Patent Office dated Jul. 20, 2022 and its English translation provided by foreign associate.
"Remaining issues on CBG-based (re)transmission," 3GPP TSG RAN WG1 Meeting #92, R1-1801541, Source: vivo, Agenda Item: 7.1.3.3.3, all pages.

* cited by examiner

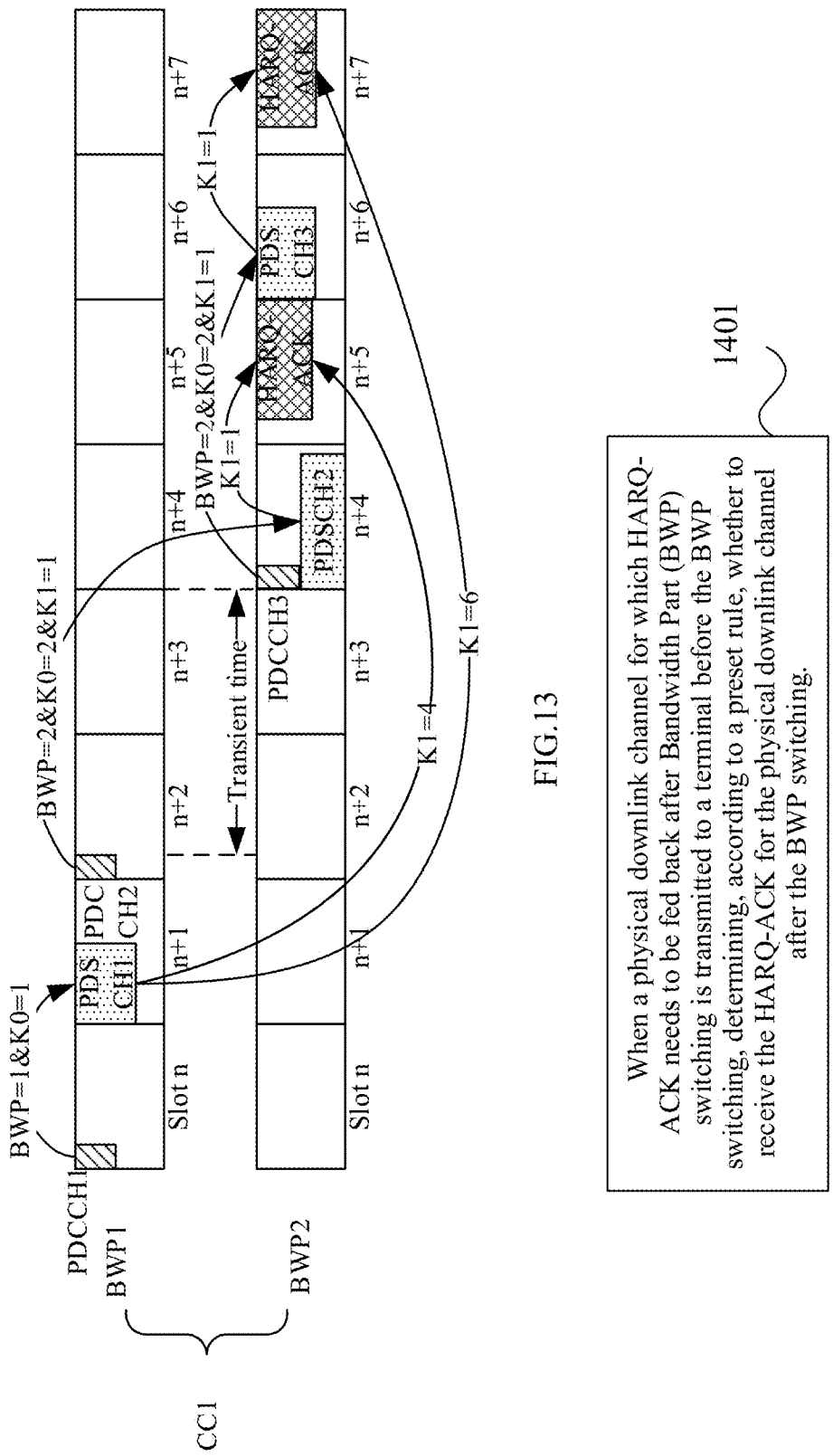

ମETHOD OF TRANSMITTING HARQ-ACK MESSAGE, TERMINAL AND BASE STATION

CROSS-REFERENCE TO RELATED APPLICATIONS

This application is a U.S. national phase application of a PCT Application No. PCT/CN2019/077996 filed on Mar. 13, 2019, which claims a priority to Chinese Patent Application No. 201810302306.0 filed on Apr. 4, 2018, the disclosures of which are incorporated in their entireties by reference herein.

TECHNICAL FIELD

The present disclosure relates to the field of communication technology, in particular, relates to a method of transmitting a HARQ-ACK message, a terminal and a base station.

BACKGROUND

With development and change of mobile communication service requirements, many organizations such as the International Telecommunication Union (ITU) have begun to study new wireless communication systems, namely 5th generation new wireless access technology (5th Generation New RAT (5G NR)). Flexible timing relations are supported in the 5G NR. For a physical downlink shared channel (Physical Downlink Shared Channel, PDSCH), a physical downlink control channel (Physical Downlink Control Channel, PDCCH) carrying scheduling information of the PDSCH indicates a scheduling timing relation (Scheduling timing) between the PDSCH and the PDCCH and a feedback timing relation between the PDSCH and a Hybrid Automatic Repeat Request Acknowledgement (HARQ-ACK) corresponding to the PDSCH. Specifically, a time domain resource allocation indication field in a Downlink Control Information (DCI) format used by the PDCCH indicates a slot offset K0 between a slot where the PDSCH is located and a slot where the DCI is located; a PDSCH-to-HARQ-ACK feedback timing indication field in the DCI indicates the number of slots K1 between the end of the PDSCH and the beginning of the HARQ-ACK, as shown in FIG. 1. The largest set of K0 is {0, 1, 2, 3, 4, 5, 8, 10, 16, 20, 32}.

The 5G NR system supports two HARQ-ACK codebook generation methods including a semi-static HARQ-ACK codebook generation method and a dynamic HARQ-ACK codebook generation method. The so-called HARQ-ACK codebook refers to a HARQ-ACK feedback sequence generated for downlink transmission for which a HARQ-ACK feedback is performed on the same time domain location or uplink channel. The Dynamic HARQ-ACK codebook is to sort HARQ-ACKs based on an indication of Downlink Assignment Index (DAI) field in a Downlink (DL) DCI and determine the total number of bits in the HARQ-ACK codebook. Thus, a size of a codebook may be dynamically changed at different feedback moments.

In the 5G NR system, a carrier may contain a maximum of 4 BandWidth Parts (BWP), and to terminal will only operate on one BWP at a time point, and this BWP is called an activated BWP. The activation of a BWP may be triggered by a timer, or by scheduling a PDCCH of a PDSCH or a Physical Uplink Shared Channel (PUSCH) to dynamically instruct switching of a BWP, that is, a DCI used by the PDCCH contains a BWP indicator field to indicate which BWP on a scheduled carrier is used for a terminal to receive the PDSCH or send the PUSCH, the indicated BWP is the activated BWP. When the indicated BWP number is different from a previous BWP number for receiving the PDSCH or sending the PUSCH, this indicates that the terminal is instructed to perform dynamic BWP switching, that is, the terminal needs to receive the PDSCH or send the PUSCH on the indicated new BWP, and start working on the new BWP after the PDSCH or the PUSCH, as shown in FIG. 2. A time interval between an end position of the PDCCH indicating switching of the BWP and a start position of the PDSCH or PUSCH scheduled by the PDCCH is called transient time which includes PDCCH processing, radio-frequency adjustment, and preparation of uplink data (for PUSCH transmission) etc. During the transient time, the terminal does not receive or send any data.

Switching of a BWP includes DL BWP switching and Uplink (UL) BWP switching. For Frequency Division Duplex (FDD), since DL and UL are paired independent spectrum, the PDCCH scheduling the PDSCH may be used to notify the DL BWP switching, the PDCCH scheduling the PUSCH may be used to notify the UL BWP switching. For Time Division Duplex (TDD), since DL and UL share a spectrum, when DL switches, the UL also switches, and vice versa, i.e., both the PDCCH scheduling the PDSCH and the PDCCH scheduling the PUSCH may be used to notify the BWP switching, and during switching, the DL DWP switching and the UL BWP switching are performed simultaneously. A BWP switching is performed when a timer expires. In case of TDD, the UL BWP and the DL BWP are switched to a default (Default) BWP simultaneously. In case of FDD, only DL BWP switching to a default BWP is supported. At present, the two switching mechanisms coexist in the system. The timer is started when the terminal switches to a new BWP (which may be a BWP indicated by the PDCCH or the default BWP switching ed to according to the timer). If a PDCCH indicating the BWP switching is correctly received, the timer will restart.

In summary, as shown in FIG. 3, when a PDCCH indicating the BWP switching is received in a slot, if a PDSCH or a PDCCH indicating release of a downlink semi-persistent scheduling (SPS) resource is also received on an original BWP before the slot, then the PDCCH indicating the release of the downlink SPS resource or the PDSCH needs HARQ-ACK feedback, but the HARQ-ACK feedback may occur after the BWP switching according to a K1 instruction. How to transmit HARQ-ACK of these PDSCHs or how to transmit HARQ-ACK of the PDCCH indicating the release of the downlink SPS resources has not been clearly provided.

SUMMARY

Some embodiments of the present disclosure provide a method of transmitting a HARQ-ACK message, a terminal, and a base station, so as to solve the problem in the related art which a clear transmission method is not provided for a situation of feeding back, after BWP switching, HARQ-ACK for a physical downlink channel received before the BWP switching.

Some embodiments of the present disclosure provide a method of transmitting a Hybrid Automatic Repeat reQuest ACKnowledge (HARQ-ACK) message. The method includes; when HARQ-ACK for a physical downlink channel received before Bandwidth Part (BWP) switching needs to be fed back after the BWP switching, determining, according to a preset rule, whether to transmit the HARQ-ACK for the physical downlink channel after the BWP switching.

In the method, the physical downlink channel includes: a physical downlink shared channel (PDSCH), or a physical downlink control channel (PDCCH) indicating release of a downlink semi-persistent scheduling (SPS) resource.

In the method, determining, according to the preset rule, whether to transmit the HARQ-ACK for the physical downlink channel after the BWP switching includes: in a case that the BWP switching occurs on a carrier not used to transmit a physical uplink control channel (PUCCH), transmitting the HARQ-ACK for the physical downlink channel after the BWP switching; and/or, in case of frequency division duplex (FDD), in a case that the BWP switching is downlink (DL) BWP switching, transmitting the HARQ-ACK for the physical downlink channel after the BWP switching.

In the method, transmitting the HARQ-ACK for the physical downlink channel after the BWP switching includes: transmitting the HARQ-ACK for the physical downlink channel through a PUCCH or a physical uplink shared channel (PUSCH) on a BWP on a carrier used to transmit the PUCCH.

In the method, determining, according to the preset rule, whether to transmit the HARQ-ACK for the physical downlink channel after the BWP switching includes: when the BWP switching occurs on a carrier used to transmit a physical uplink control channel (PUCCH), or when the BWP switching occurs on a carrier used to transmit a PUCCH and the BWP switching is uplink (UL) BWP switching in case of FDD, or when the BWP switching occurs on a carrier used to transmit a PUCCH and is time division duplex (TDD), not transmitting the HARQ-ACK for the physical downlink channel through a PUCCH after the BWP switching; or not transmitting the HARQ-ACK for the physical downlink channel through a PUCCH alone after the BWP switching; or after the BWP switching, transmitting the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

In the method, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

In the method, the BWP switching includes downlink (DL) BWP switching and/or uplink (UL) BWP switching.

In the method, in case of time division duplex (TDD), the BWP switching includes: uplink (UL) BWP switching and downlink (DL) BWP switching triggered by a timer or triggered by a PDCCH carrying a UL grant or a DL grant; or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

In the method, when the HARQ-ACK for the physical downlink channel is transmitted after the BWP switching, the method further includes: in case of TDD, transmitting the HARQ-ACK using a dynamic HARQ-ACK codebook; or, in case of FDD, when DL BWP switching is performed, transmitting the HARQ-ACK using a dynamic HARQ-ACK codebook; or, in case of FDD, when UL BWP switching is performed, transmitting the HARQ-ACK using a dynamic HARQ-ACK codebook or a semi-static HARQ-ACK codebook.

Some embodiments of the present disclosure further provide a method of transmitting a Hybrid Automatic Repeat reQuest ACKnowledge (HARQ-ACK) message. The method includes: when a physical downlink channel for which HARQ-ACK needs to be fed back after Bandwidth Part (BWP) switching is transmitted to a terminal before the BWP switching, determining, according to a preset rule, whether to receive the HARQ-ACK for the physical downlink channel after the BWP switching.

In the method, the physical downlink channel includes: a physical downlink shared channel (PDSCH), or a physical downlink control channel (PDCCH) indicating release of a downlink semi-persistent scheduling (SPS) resource.

In the method, determining, according to the preset rule, whether to receive the HARQ-ACK for the physical downlink channel after the BWP switching includes: in a case that the BWP switching occurs on a carrier not used to transmit a physical uplink control channel (PUCCH), receiving the HARQ-ACK for the physical downlink channel after the BWP switching; and/or, in case of frequency division duplex (FDD), in a case that the BWP switching is downlink (DL) BWP switching, receiving the HARQ-ACK for the physical downlink channel after the BWP switching.

In the method, receiving the HARQ-ACK for the physical downlink channel after the BWP switching includes: receiving the HARQ-ACK for the physical downlink channel through a PUCCH or a physical uplink shared channel (PUSCH) on a BWP on a carrier used to transmit the PUCCH.

In the method, determining, according to the preset rule, whether to receive the HARQ-ACK for the physical downlink channel after the BWP switching includes: when the BWP switching occurs on a carrier used to transmit a PUCCH, or when the BWP switching occurs on a carrier used to transmit a PUCCH and the BWP switching is uplink (UL) BWP switching in case of FDD, or when the BWP switching occurs on a carrier used to transmit a PUCCH and is time division duplex (TDD), not receiving the HARQ-ACK for the physical downlink channel after the BWP switching; or not receiving the HARQ-ACK for the physical downlink channel through a PUCCH alone after the BWP switching; or after the BWP switching, receiving the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

In the method, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

In the method, the BWP switching includes downlink (DL) BWP switching and/or uplink (UL) BWP switching.

In the method, in case of time division duplex (TDD), the BWP switching includes: uplink (UL) BWP switching and downlink (DL) BWP switching triggered by a timer or triggered by a PDCCH carrying a UL grant or a DL grant; or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

In the method, when the HARQ-ACK for the physical downlink channel is transmitted after the BWP switching, in case of TDD, the HARQ-ACK is transmitted using a dynamic HARQ-ACK codebook; or, in case of FDD, when DL BWP switching is performed, the HARQ-ACK is transmitted using a dynamic HARQ-ACK codebook; or, in case of FDD, when UL BWP switching is performed, the HARQ-ACK is transmitted using a dynamic HARQ-ACK codebook or a semi-static HARQ-ACK codebook.

Some embodiments of the present disclosure further provide a terminal. The terminal includes: a transceiver, a storage, a processor, and a computer program stored on the storage and executable on the processor, wherein when the processor executes the computer program, the processor following steps: when Hybrid Automatic Repeat reQuest ACKnowledge (HARQ-ACK) for a physical downlink channel received before Bandwidth Part (BWP) switching needs to be fed back after the BWP switching, determining, according to a preset rule, whether to transmit the HARQ-ACK for the physical downlink channel after the BWP switching.

In the terminal, the physical downlink channel includes: a physical downlink shared channel (PDSCH), or a physical downlink control channel (PDCCH) indicating release of a downlink semi-persistent scheduling (SPS) resource.

In the terminal, the processor is further configured to perform the following steps: in a case that the BWP switching occurs on a carrier not used to transmit a physical uplink control channel (PUCCH), transmitting the HARQ-ACK for the physical downlink channel after the BWP switching through the transceiver; and/or, in case of frequency division duplex (FDD), in a case that the BWP switching is downlink (DL) BWP switching, transmitting the HARQ-ACK for the physical downlink channel after the BWP switching.

In the terminal, the transceiver is further configured to perform the following steps: transmitting the HARQ-ACK for the physical downlink channel through a PUCCH or a physical uplink shared channel (PUSCH) on a BWP on a carrier used to transmit the PUCCH.

In the terminal, the processor is further configured to perform the following steps: when the BWP switching occurs on a carrier used to transmit a physical uplink control channel (PUCCH), or when the BWP switching occurs on a carrier used to transmit a PUCCH and the BWP switching is uplink (UL) BWP switching in case of FDD, or when the BWP switching occurs on a carrier used to transmit a PUCCH and is time division duplex (TDD), controlling the transceiver to not transmit the HARQ-ACK for the physical downlink channel through a PUCCH after the BWP switching, or not transmit the HARQ-ACK for the physical downlink channel through a PUCCH alone after the BWP switching, or after the BWP switching, transmit the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

In the terminal, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

In the terminal, the BWP switching includes downlink (DL) BWP switching and/or uplink (UL) BWP switching.

In the terminal, in case of time division duplex (TDD), the BWP switching includes: uplink (UL) BWP switching and downlink (DL) BWP switching triggered by a timer or triggered by a PDCCH carrying a UL grant or a DL grant; or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

In the terminal, when the HARQ-ACK for the physical downlink channel is transmitted after the BWP switching through the transceiver, in case of TDD, the HARQ-ACK is transmitted using a dynamic HARQ-ACK codebook; or, in case of FDD, when DL BWP switching is performed, the HARQ-ACK is transmitted using a dynamic HARQ-ACK codebook; or, in case of FDD, when UL BWP switching is performed, the HARQ-ACK is transmitted using a dynamic HARQ-ACK codebook or a semi-static HARQ-ACK codebook.

Some embodiments of the present disclosure further provide a computer-readable storage medium, wherein a computer program is stored on the computer-readable storage medium, wherein when the computer program is executed by a processor, the processor implements steps in the method of transmitting a Hybrid Automatic Repeat reQuest ACKnowledge (HARQ-ACK) message applied to a terminal side.

Some embodiments of the present disclosure further provide a base station. The base station includes a transceiver, a storage, a processor, and a computer program stored on the storage and executable on the processor, wherein when the processor executes the computer program, the processor following steps: when a physical downlink channel for which Hybrid Automatic Repeat reQuest ACKnowledge (HARQ-ACK) needs to be fed back after Bandwidth Part (BWP) switching is transmitted to a terminal before the BWP switching, determining, according to a preset rule, whether to receive the HARQ-ACK for the physical downlink channel after the BWP switching.

In the base station, the physical downlink channel includes: a physical downlink shared channel (PDSCH), or a physical downlink control channel (PDCCH) indicating release of a downlink semi-persistent scheduling (SPS) resource.

In the base station, the processor is further configured to perform the following steps: in a case that the BWP switching occurs on a carrier not used to transmit a physical uplink control channel (PUCCH), receiving the HARQ-ACK for the physical downlink channel after the BWP switching through the transceiver; and/or, in case of frequency division duplex (FDD), in a case that the BWP switching is downlink (DL) BWP switching, receiving the HARQ-ACK for the physical downlink channel after the BWP switching.

In the base station, the transceiver is further configured to perform the following step: receiving the HARQ-ACK for the physical downlink channel through a PUCCH or a physical uplink shared channel (PUSCH) on a BWP on a carrier used to transmit the PUCCH.

In the base station, the processor is further configured to perform the following steps: when the BWP switching occurs on a carrier used to transmit a PUCCH, or when the BWP switching occurs on a carrier used to transmit a PUCCH and the BWP switching is uplink (UL) BWP switching in case of FDD, or when the BWP switching occurs on a carrier used to transmit a PUCCH and is time division duplex (TDD), controlling the transceiver to: not receive the HARQ-ACK for the physical downlink channel after the BWP switching, or not receive the HARQ-ACK for the physical downlink channel through a PUCCH alone after the BWP switching, or after the BWP switching, receive the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

In the base station, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

In the base station, the BWP switching includes downlink (DL) BWP switching and/or uplink (UL) BWP switching.

In the base station, in case of time division duplex (TDD), the BWP switching includes: uplink (UL) BWP switching and downlink (DL) BWP switching triggered by a timer or triggered by a PDCCH carrying a UL grant or a DL grant; or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

In the base station, when the HARQ-ACK for the physical downlink channel is transmitted after the BWP switching through the transceiver, then in case of TDD, the HARQ-ACK is transmitted using a dynamic HARQ-ACK codebook; or, in case of FDD, when DL BWP switching is performed, the HARQ-ACK is transmitted using a dynamic HARQ-ACK codebook; or, in case of FDD, when UL BWP switching is performed, the HARQ-ACK is transmitted using a dynamic HARQ-ACK codebook or a semi-static HARQ-ACK codebook.

Some embodiments of the present disclosure further provide a computer-readable storage medium wherein, a computer program is stored on the computer-readable storage medium, wherein when the computer program is executed by a processor, the processor implements steps in the method of transmitting a Hybrid Automatic Repeat reQuest ACKnowledge (HARQ-ACK) message applied to a base station side.

Some embodiments of the present disclosure further provide a terminal. The terminal includes: a first determining module, configured to: when Hybrid Automatic Repeat reQuest ACKnowledge (HARQ-ACK) for a physical downlink channel received before Bandwidth Part (BWP) switching needs to be fed back after the BWP switching, determine, according to a preset rule, whether to transmit the HARQ-ACK for the physical downlink channel after the BWP switching.

Some embodiments of the present disclosure further provide a base station. The base station includes a second determining module, configured to: when a physical downlink channel for which Hybrid Automatic Repeat reQuest ACKnowledge (HARQ-ACK) needs to be fed back after Bandwidth Part (BWP) switching is transmitted to a terminal before the BWP switching, determine, according to a preset rule, whether to receive the HARQ-ACK for the physical downlink channel after the BWP switching.

A beneficial effect of the technical solutions of the embodiments of the present disclosure includes following at least: in the technical solutions of the present disclosure, when a physical downlink channel received before Bandwidth Part (BWP) switching needs HARQ-ACK feedback to be performed after the BWP switching, whether the HARQ-ACK for the physical downlink channel is transmitted after BWP switching is determined according to a preset rule. According to a configured condition, a condition of HARQ-ACK transmission for the physical downlink channel after the BWP switching may be determined, thereby ensuring normal feedback of the HARQ-ACK for the physical downlink channel during the BWP switching, and improving a system efficiency.

BRIEF DESCRIPTION OF THE DRAWINGS

Technical solutions in some embodiments of the present disclosure will be clearly and completely described below in conjunction with the drawings in some embodiments of the present disclosure. Obviously, the described embodiments are part, rather than all, of the embodiments of the present disclosure. Based on the embodiments in the present disclosure, all other embodiments obtained by those of ordinary skill in the art without creative work shall fall within the protection scope of the present disclosure.

FIG. 13 shows a schematic diagram of HARQ-ACK message transmission in a sixth example according to some embodiments of the present disclosure;

FIG. 14 shows a second schematic diagram of a HARQ-ACK message transmission method according to some embodiments of the present disclosure;

DETAILED DESCRIPTION

The technical solutions in some embodiments of the present disclosure will be clearly and completely described below in conjunction with the drawings in some embodiments of the present disclosure. Obviously, the described embodiments are part, rather than all, of the embodiments of the present disclosure. Based on the embodiments in the present disclosure, all other embodiments obtained by those of ordinary skill in the art without creative work shall fall within the protection scope of the present disclosure.

Figure 1:
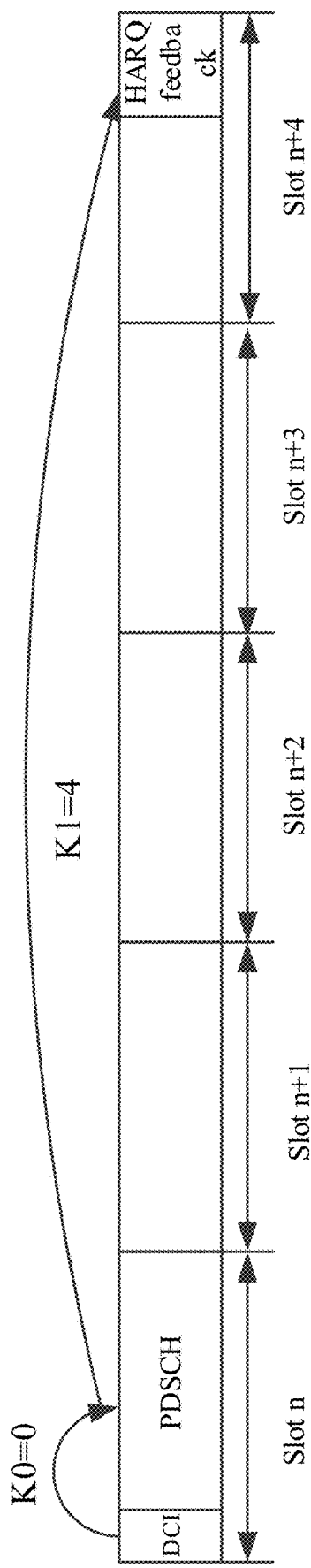
FIG. 1 shows a schematic diagram of a slot offset and the number of slots indicated by a DCI used by a PDCCH in the related art.
Figure 2:
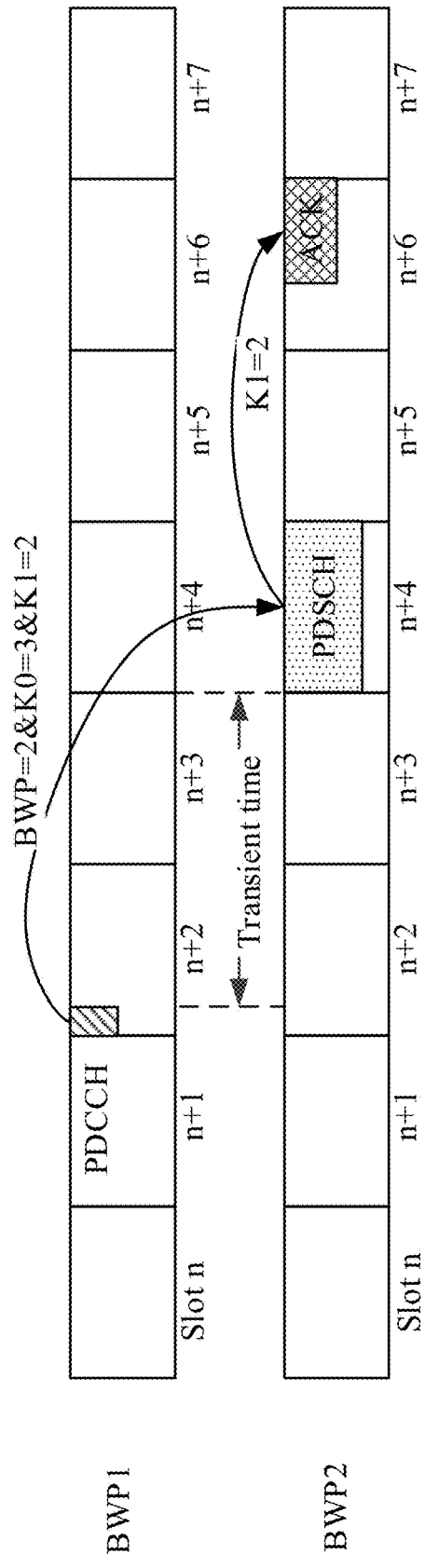
FIG. 2 shows a schematic diagram of BWP switching in the related art.
Figures 3, 4:
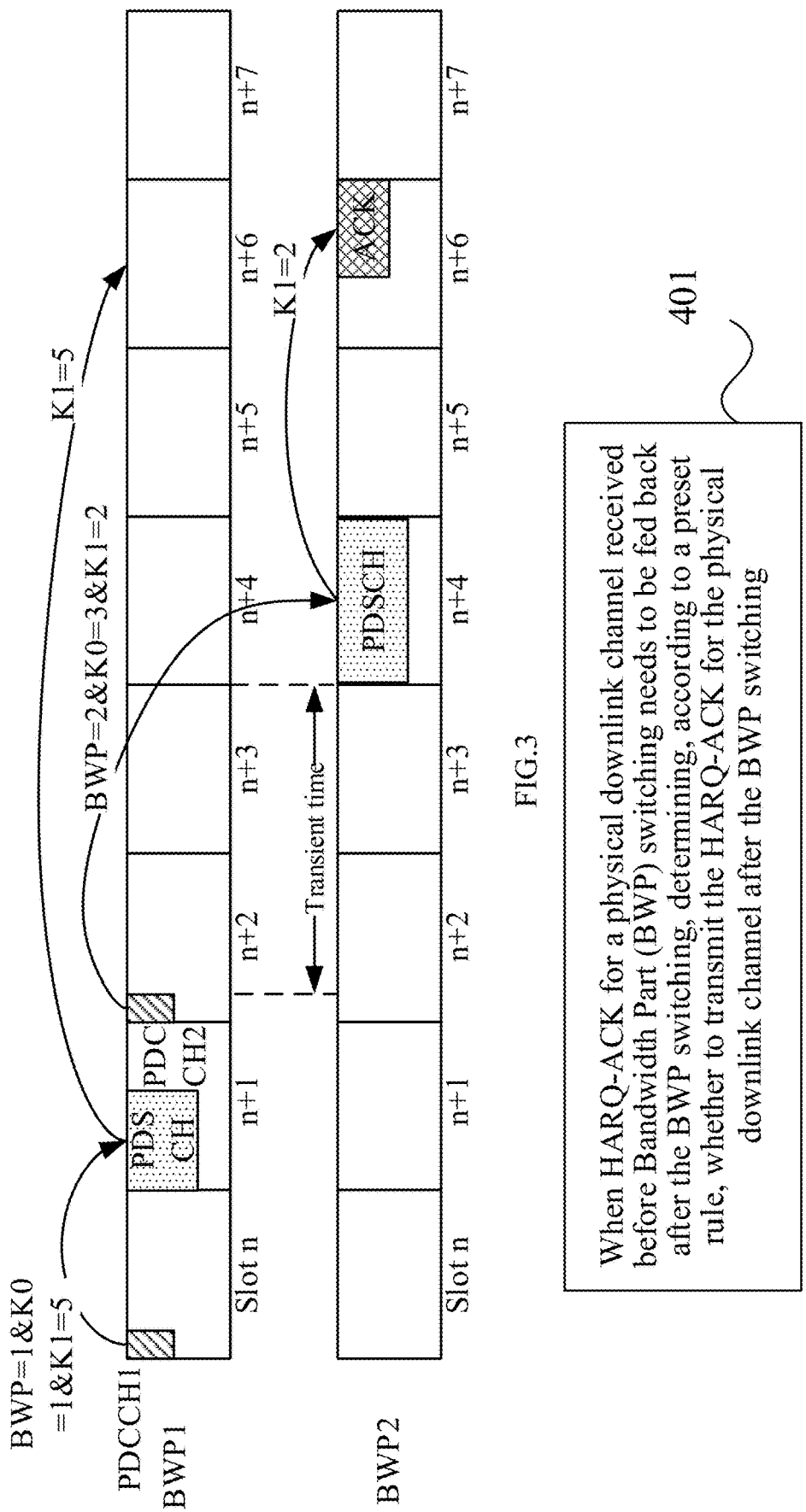
FIG. 3 shows a schematic diagram of HARQ-ACK feedback of a physical downlink channel received on an original BWP being performed after BWP switching in the related art.
FIG. 4 shows a first schematic diagram of a HARQ-ACK message transmission method according to some embodiments of the present disclosure.

Some embodiments of the present disclosure provide a method of transmitting a Hybrid Automatic Repeat reQuest ACKnowledge (HARQ-ACK) message. As shown in FIG. 4, the method includes a Step 401.

Step 401: when HARQ-ACK for a physical downlink channel received before Bandwidth Part (BWP) switching needs to be fed back after the BWP switching, determining, according to a preset rule, whether to transmit the HARQ-ACK for the physical downlink channel after the BWP switching.

When the terminal receives, before the BWP switching, the physical downlink channel sent by the base station, and the HARQ-ACK for the received physical downlink channel needs to be fed back after the BWP switching, the terminal may determine, according a preset rule jointly formulated with the base station, whether to transmit the HARQ-ACK for the physical downlink channel after the BWP switching. If it is determined that the HARQ-ACK for the physical downlink channel is transmitted after the BWP switching, a corresponding strategy may be used to perform a transmission process.

The above method may determine, according to a configured condition, a condition of HARQ-ACK transmission for the physical downlink channel after the BWP switching, and may ensure a normal feedback of the HARQ-ACK for the physical downlink channel during the BWP switching, and improve a system efficiency.

The physical downlink channel includes: a physical downlink shared channel (PDSCH), or a physical downlink control channel (PDCCH) indicating release of a downlink semi-persistent scheduling (SPS) resource.

When a PDSCH needing a HARQ-ACK feedback after the BWP switching is received before the BWP switching, it may be determined, according to the preset rule, whether a HARQ-ACK for the PDSCH may be transmitted after the BWP switching; if the PDCCH indicating the release of the downlink SPS resource and needing a HARQ-ACK feedback after the BWP switching is received before the BWP switching, it may be determined, according to a preset rule, whether the HARQ-ACK for the PDCCH may be transmitted after the BWP switching.

In some embodiments of the present disclosure, the step of determining, according to the preset rule, whether to transmit the HARQ-ACK for the physical downlink channel after the BWP switching includes: in a case that the BWP switching occurs on a carrier not used to transmit a physical uplink control channel (PUCCH), transmitting the HARQ-ACK for the physical downlink channel after the BWP switching; and/or, in case of frequency division duplex (FDD), in a case that the BWP switching is DL BWP switching, transmitting the HARQ-ACK for the physical downlink channel after the BWP switching.

When determining whether to transmit the HARQ-ACK for the physical downlink channel after the BWP switching, whether the BWP switching occurs on the carrier used to transmit a Physical Uplink Control Channel (PUCCH) may be detected first, if the BWP switching occurs on a carrier not used to transmit a PUCCH, then the HARQ-ACK for the physical downlink channel may be transmitted after the BWP switching.

Another case is that, in case of frequency division duplex (FDD), when the BWP switching is the DL BWP switching, the HARQ-ACK for the physical downlink channel is transmitted after the BWP switching; that is, for a FDD system, whether the DL BWP switching occurs on a carrier used to transmit a PUCCH or a carrier not used to transmit the PUCCH does not affect HARQ-ACK transmission. This is because, for the FDD, when there is only DL BWP switching, an UL BWP used to transmit the PUCCH is not changed. Therefore, whether an uplink channel transmission resource on the UL BWP is determined based on the PDCCH before the switching or the PDCCH after the switching, no conflict is generated.

In some embodiments of the present disclosure, when it is determined that the HARQ-ACK for the physical downlink channel may be transmitted after the BWP switching, a transmission process needs to be performed. The step of transmitting the HARQ-ACK for the physical downlink channel after the BWP switching includes: transmitting the HARQ-ACK for the physical downlink channel through a PUCCH or a physical uplink shared channel (PUSCH) on a BWP on a carrier used to transmit the PUCCH.

When the HARQ-ACK for the physical downlink channel is transmitted after the BWP switching, the transmission may be performed on one BWP on the carrier used to transmit the PUCCH, specifically, the transmission may be performed through the PUCCH or a PUSCH.

A case where the BWP switching occurs on a carrier not used to transmit a PUCCH is illustrated by way a specific example below, see a first example.

First Example

Figure 5:
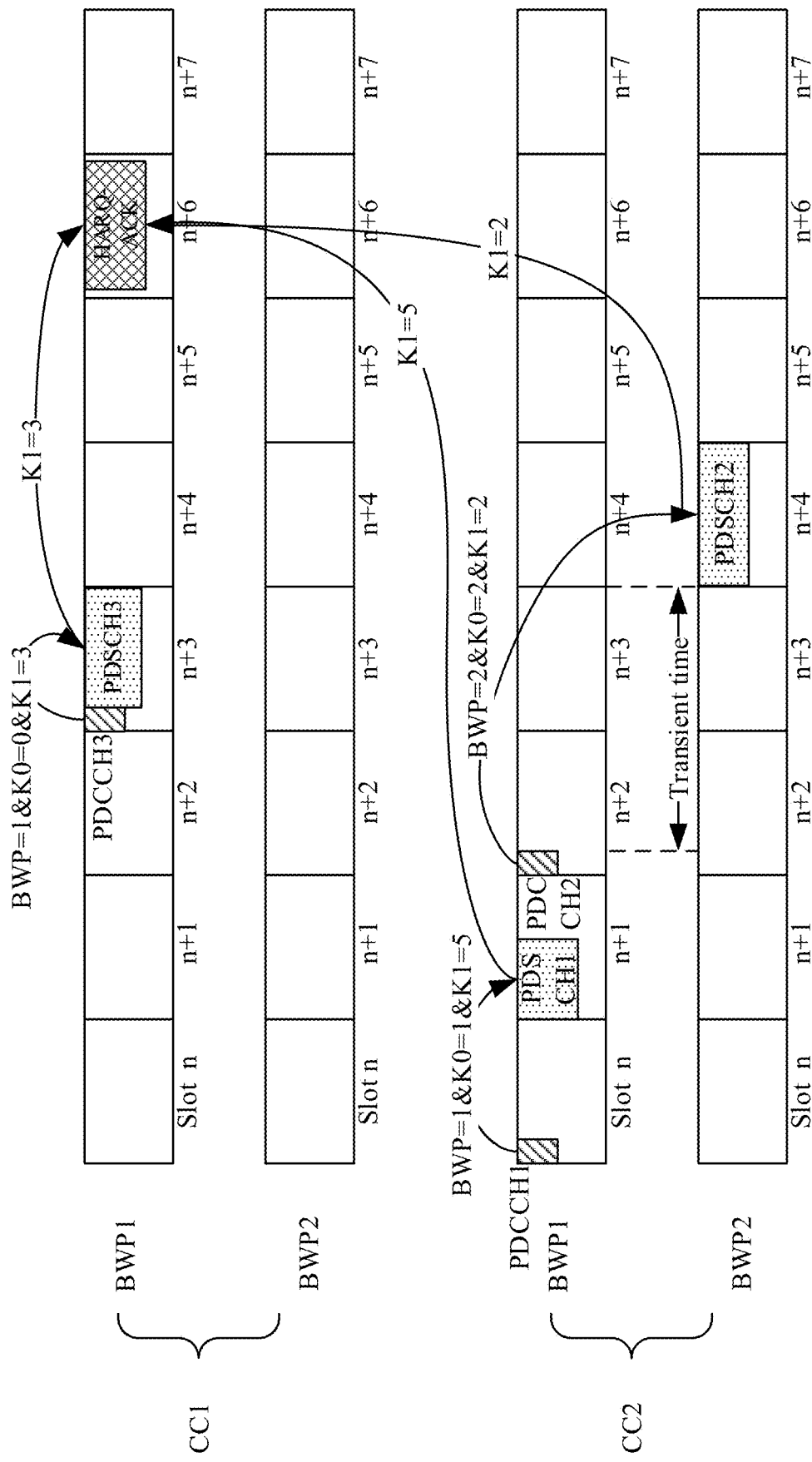
FIG. 5 shows a schematic diagram of HARQ-ACK message transmission in TDD in a first example according to some embodiments of the present disclosure.

As shown in FIG. 5; a Component Carrier (CC) 1 is used to transmit a PUCCH, an activated BWP is BWP1, and CC2 is a Secondary Component Carrier (SCC) not used to transmit a PUCCH. When DL BWP switching on the CC2, the CC and the BWP transmitting HARQ-ACK feedback information are not changed. Therefore, whether downlink transmission on the CC2 before a DL SWP before the switching or a DL BWP after the switching, HARQ-ACK feedback may be transmitted at a corresponding time point on the BWP1 on the CC1 determined according to an indicated K1. For example, according to scheduling, it is determined that HARQ-ACKs for PDSCH3 on a DL BWP1 of a CC1, PDSCH1 on a DL BWP1 of a CC2, and PDSCH2 on a DL BWP2 of CC2 are all fed back in a slot n+6 on an UL BWP1 of the CC1, then in case of dynamic HARQ-ACK codebook, the base station may continuously count multiple PDSCHs through a Counter DAI (C-DAI) in the DCI used by each PDCCH, and use a Total DAI (T-DAI) to give the total number of HARQ-ACK bits transmitted in a slot n+6, thereby realizing that the HARQ-ACKs for the PDSCHs before the DL BWP switching and after the DL BWP switching on the CC2 are multiplexed in the same PUCCH for transmission, and a resource for the PUCCH is indicated by a HARQ-ACK resource indication (ACK resource indication, ARI) field in the last PDCCH. Of course, the HARQ-ACKs for the PDSCH1, the PDSCH2, and the PDSCH3 may also be transmitted in different slots on the BWP1 of the CC1, this is equivalent to determining time-domain locations according to values of K1 in PDCCHs scheduling the PDSCH1, the PDSCH2 and the PDSCH3, respectively, and determining PUCCH resources in corresponding slots according to indication of HARQ-ACK resource indicator fields, and performing transmission separately. If the UL BWP switching is performed on the CC2, then transmission, on the BWP1 of the CC1, of the HARQ-ACK feedback for downlink transmission is also not affected.

Figure 6:
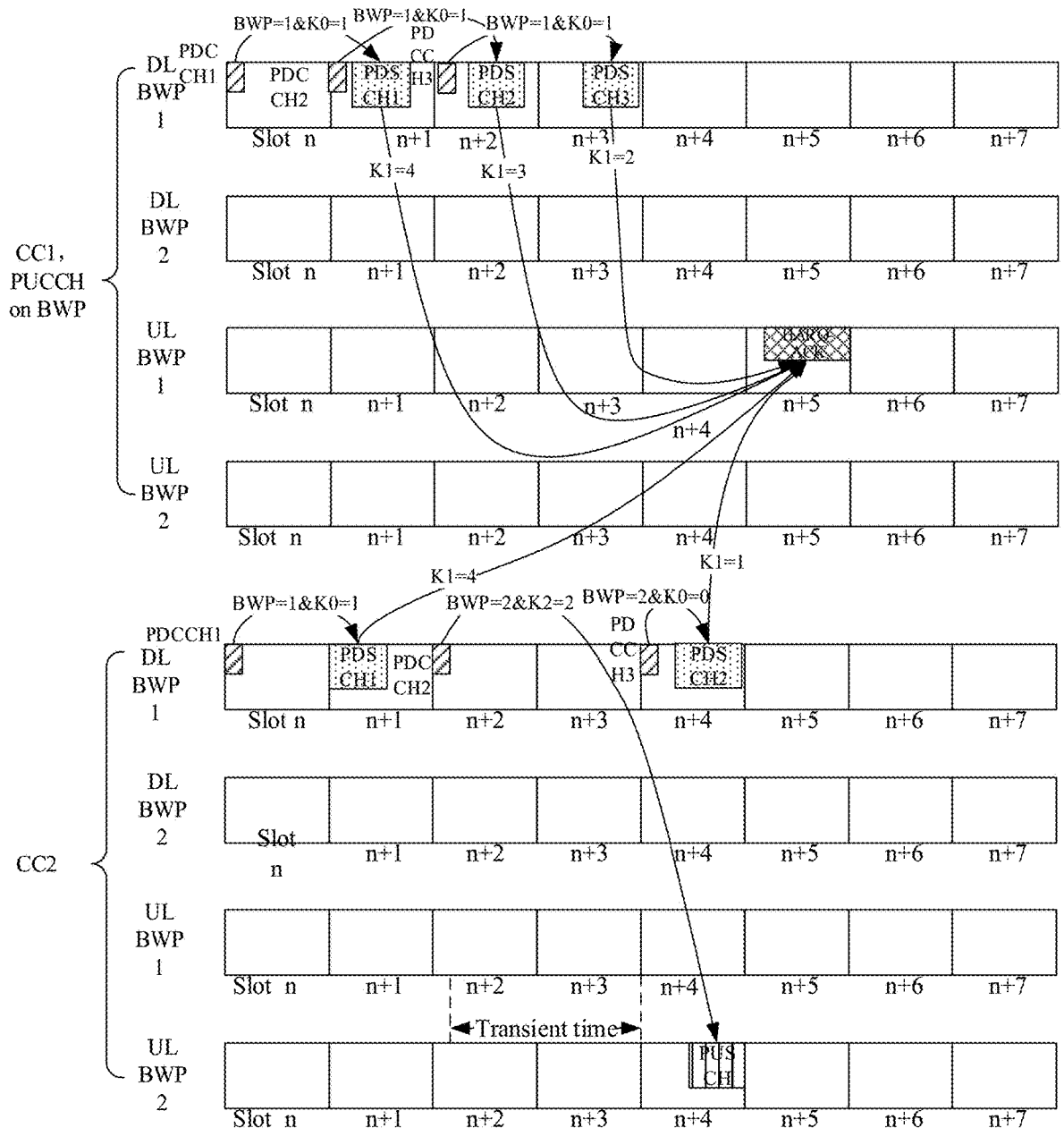
FIG. 6 shows a schematic diagram of HARQ-ACK message transmission for UL BWP switching in FDD in the first example according to some embodiments of the present disclosure.
Figure 7:
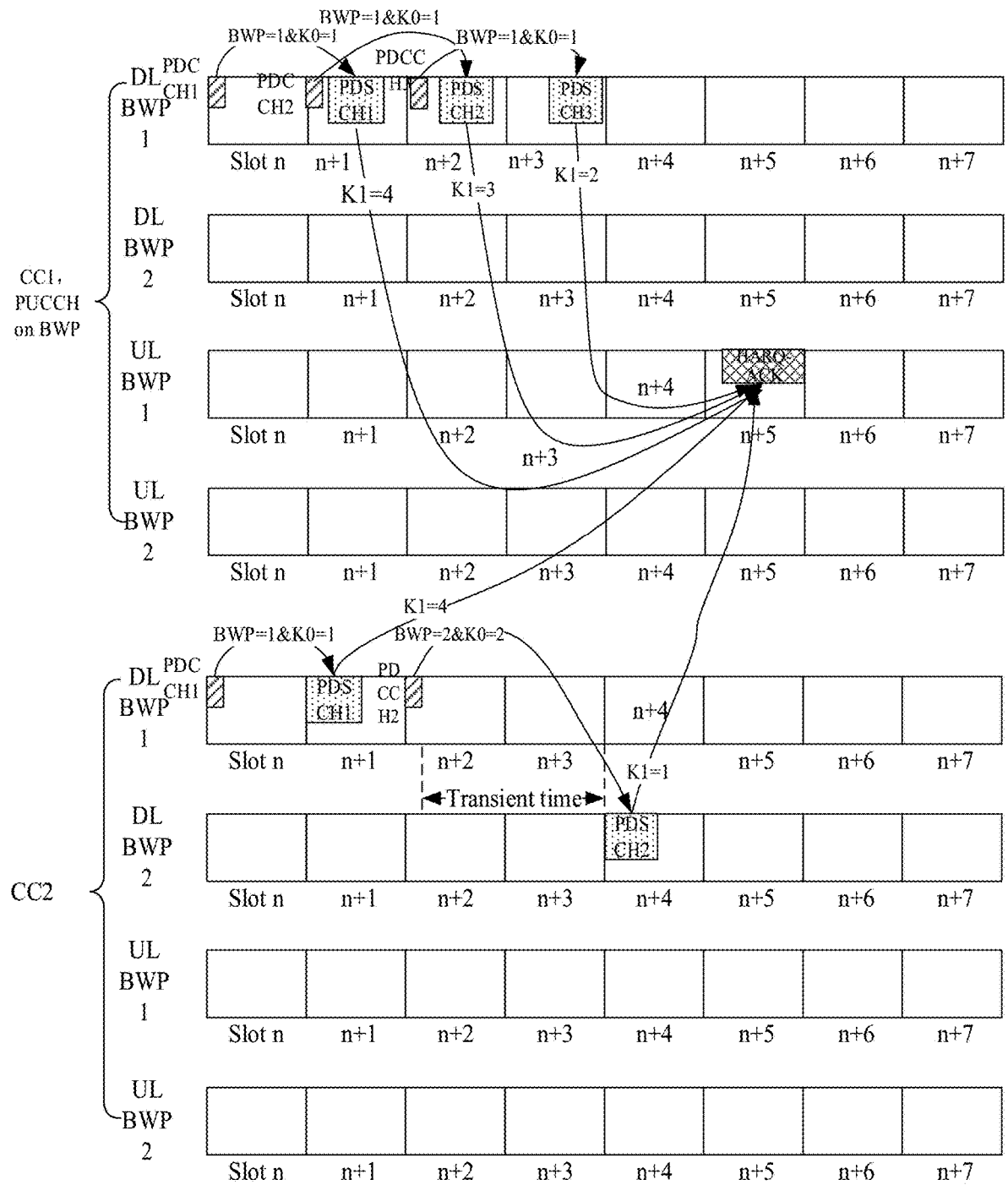
FIG. 7 shows a schematic diagram of HARQ-ACK message transmission for UL BWP switching in FDD in the first example according to some embodiments of the present disclosure.

A detailed case for the FDD performed for UL switching or DL switching on the carrier not used to transmit a PUCCH is similar to that for TDD, as shown in FIGS. 6 and 7, and a specific process thereof will not be repeated. In addition, for the FDD, when the DL switching occurs on a carrier used to transmit a PUCCH, since an UL BWP used to transmit the PUCCH has not been changed, a resource indication before and after the switching is not affected, and a HARQ-ACK feedback for downlink transmission before the switching may also be transmitted after the switching.

The following describes a case where the BWP switching occurs on the carrier used to transmit a PUCCH.

In some embodiments of the present disclosure, the step of determining, according to the preset rule, whether to transmit the HARQ-ACK for the physical downlink channel after the BWP switching includes: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), performing following: not transmitting the HARQ-ACK for the physical downlink channel through a PUCCH after the BWP switching, or not transmitting the HARQ-ACK for the physical downlink channel through a PUCCH alone after the BWP switching, or after the BWP switching, transmitting the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

When the BWP switching occurs on the carrier used to transmit a PUCCH, or if the BWP switching occurs on the carrier used to transmit a PUCCH and is FDD, the BWP switching is UL BWP switching, or if the BWP switching occurs on the carrier used to transmit a PUCCH and the carrier is TDD, a transmission situation of the HARQ-ACK for the physical downlink channel after the BWP switching may include the following types: the HARQ-ACK for the physical downlink channel is not transmitted through the PUCCH after the BWP switching; or the HARQ-ACK for the physical downlink channel is not transmitted through the PUCCH alone after the BWP switching; or after the BWP switching, an uplink channel is determined according to the PDCCH indicating the BWP switching, or according to the PDCCH transmitted after the BWP switching is completed, or according to a PDCCH transmitted after a point of the BWP switching, the HARQ-ACK for the physical downlink channel may be transmitted on the determined uplink channel. It should be noted that a moment at which the switching is completed is a moment after the time point of the switching.

The uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

The HARQ-ACK for the physical downlink channel may be transmitted on the determined uplink channel after the BWP switching is completed, and the determined uplink channel here may be a PUCCH or a PUSCH. The PUCCH may be determined according to the HARQ-ACK resource indicator field in the PDCCH indicating the BWP switching, or may also be determined according to the HARQ-ACK resource indicator field in the PDCCH transmitted after the BWP switching is completed, or may also be determined according to the HARQ-ACK resource indicator field in PDCCH transmitted after the point of the BWP switching.

When determining the PUSCH, a PUSCH scheduled by the PDCCH indicating the BWP switching may be used as the PUSCH for transmitting the HARQ-ACK for the physical downlink channel, a PUSCH scheduled by the PDCCH transmitted after the BWP switching is completed may also be used as the PUSCH for transmitting the HARQ-ACK for the physical downlink channel, the PUSCH scheduled by the PDCCH transmitted after the point of the BWP switching may also be used as the PUSCH for transmitting the HARQ-ACK for the physical downlink channel. In such a case, it is also necessary to ensure that a HARQ-ACK may be transmitted on a PUSCH, for example, a start symbol of a PUCCH resource corresponding to the HARQ-ACK is ahead of a start symbol of the PUSCH or is aligned with a start symbol of the PUSCH.

Whether the BWP switching occurs on a carrier used to transmit a PUCCH or on a carrier not used to transmit a PUCCH, the BWP switching includes downlink (DL) BWP switching and/or uplink (UL) BWP switching.

In case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

Specifically, in case of TDD, the BWP switching includes: UL/DL BWP switching triggered by a timer or a PDCCH, wherein the UL BWP switching and the DL BWP switching in case of TDD are performed simultaneously. In case of FDD, the BWP switching includes: DL BWP switching and/or UL BWP switching triggered by a timer or a PDCCH indication, where the DL BWP switching may be triggered by a timer or a PDCCH carrying a DL grant, and the UL BWP switching may be triggered by a PDCCH carrying a UL grant.

When the HARQ-ACK for the physical downlink channel is transmitted after the BWP switching, the method includes: in case of TDD, transmitting the HARQ-ACK using a dynamic HARQ-ACK codebook; or, in case of FDD, when the DL BWP switching is performed, transmitting the HARQ-ACK using a dynamic HARQ-ACK codebook; or, in case of FDD, when the UL BWP switching is performed, transmitting the HARQ-ACK using a dynamic HARQ-ACK codebook or a semi-static HARQ-ACK codebook.

When transmitting the HARQ-ACK for the physical downlink channel, for TDD and when the DL BWP switching occurs, the HARQ-ACK is transmitted using the dynamic HARQ-ACK codebook; in case of FDD, the DL BWP switching and the UL BWP switching have different corresponding transmissions, that is, when the DL BWP switching occurs, HARQ-ACK is transmitted using a dynamic HARQ-ACK codebook; when the UL BWP switching occurs, HARQ-ACK may be transmitted using the dynamic HARQ-ACK codebook or semi-static HARQ-ACK codebook.

The foregoing is a general description of a situation where BWP switching occurs on a carrier used to transmit a PUCCH. The following describes in detail each specific situation where BWP switching occurs on a carrier used to transmit a PUCCH.

First Case

When a UL BWP switching indicated by a UL grant or triggered by a timer occurs, a HARQ-ACK for a physical downlink channel is not transmitted through a PUCCH on a UL BWP after the switching; or the HARQ-ACK for the physical downlink channel is not transmitted through a PUCCH alone on a UL BWP after the switching; or the HARQ-ACK for the physical downlink channel is transmitted, on the UL BWP after the switching, on a PUCCH determined according to a HARQ-ACK resource indicator field in a PDCCH transmitted after the BWP switching is completed, or on a PUCCH determined according to a HARQ-ACK resource indicator field in a PDCCH transmitted after a point of the BWP switching. Specifically, the HARQ-ACK for the physical downlink channel and the HARQ-ACK corresponding to the PDCCH transmitted after the BWP switching is completed or the HARQ-ACK corresponding to the PDCCH transmitted after a UL BWP switching point are multiplexed on the same PUCCH for transmission.

The HARQ-ACK corresponding to the PDCCH transmitted after the BWP switching is completed or the HARQ-ACK corresponding to the PDCCH transmitted after the UL BWP switching point includes: a HARQ-ACK of a PDCCH when the PDCCH is a PDCCH indicating a release of a downlink SPS resource, a HARQ-ACK of a PDSCH when the PDCCH is used to schedule transmission of the PDSCH.

The switching point is a time point at which the UL BWP switching is determined to be performed, for example, an end position of an UL grant indicating the BWP switching is used as the switching point, or a time point at which a timer expires is used as the switching point.

In case of TDD, HARQ-ACK is transmitted using a dynamic HARQ-ACK codebook; in case of FDD, HARQ-ACK may be transmitted using a dynamic HARQ-ACK codebook or a semi-static HARQ-ACK codebook.

The PUCCH cannot be transmitted during transient time corresponding to the switching, that is, is transmitted after the transient time.

In case of FDD, the UL BWP switching may be triggered by a PDCCH carrying UL grant or triggered by a timer. In case of TDD, the UL/DL BWP switching may be triggered by a timer or a PDCCH carrying a UL grant.

The first case in which the BWP switching occurs on a carrier used to transmit a PUCCH is described by way of specific examples, see a second example and a third example.

Second Example

Figure 8:
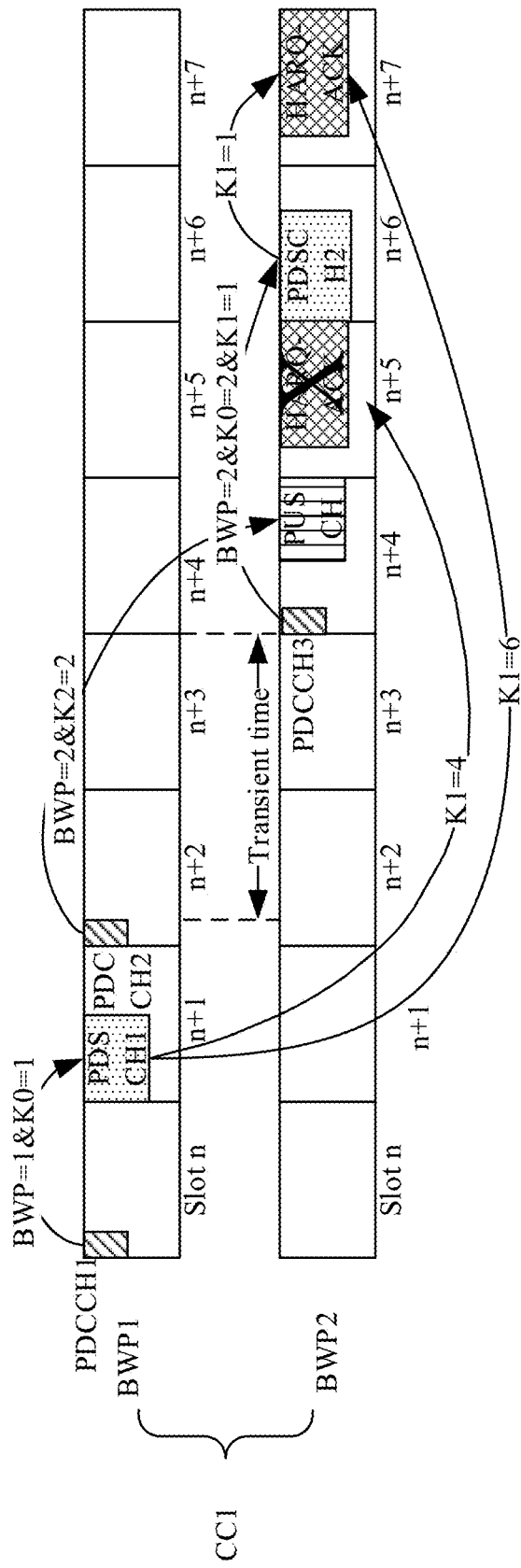
FIG. 8 shows a schematic diagram of HARQ-ACK message transmission for TDD in a second example according to some embodiments of the present disclosure.

In case of TDD, as shown in FIG. 8, assuming that CC1 is a CC transmitting a PUCCH, an original activated BWP is BWP1, and a base station sends PDCCH2 in a slot n+2 to schedule the terminal to receive a PUSCH on BWP2, that is, the PDCCH2 is an UL grant indicating the UL/DL BWP switching. In this case, if there is PDSCH1, on the BWP1 before the PDCCH2, needing a HARQ-ACK feedback to be performed after the BWP switching, and a time-domain position of the HARQ-ACK feedback is determined according to a K1 value indicated in the PDCCH1 scheduling the PDSCH.

For example, when K1=4, it is determined to perform the feedback in a slot n+5 after the switching. There is no PUSCH or PUCCH resource, in this slot, scheduled by any PDCCH transmitted after the switching is completed (since the PDCCHs are transmitted after the switching is completed, an uplink resource indicated in these PDCCHs is directed to a UL BWP after the switching, because a TDD UL and a TDD DL are switched simultaneously, such PDCCH is also sent on the BWP2 after the switching). Therefore, if the terminal needs to transmit, in the slot n+5 on BWP2 after the switching, the HARQ-ACK for PDSCH1 before the switching, the terminal may only acquire a PUCCH resource according to the ARI field in the PDCCH1 scheduling the PDSCH1, but the ARI field actually indicates a PUCCH resource on the BWP1 before the switching, instead of a PUCCH resource on the BWP2 after the switching. Therefore, when transmission on the BWP2 is performed using a PUCCH resource on the BWP2 determined by the ARI field, and if the base station has allocated the PUCCH resource on BWP2 to other terminals, PUCCH resources for different terminals will conflict with each other, therefore affecting HARQ-ACK transmission for each terminal. Thus, in this case, in order to avoid PUCCH resources from conflicting, the HARQ-ACK for the PDSCH1 before the switching is not transmitted through a PUCCH alone after the switching.

As another example, when K1=6, it is determined that feedback is performed in a slot n+7 after the switching, and there is a PUCCH resource, in this slot, scheduled by a PDCCH transmitted after the switching is completed (because these PDCCHs are transmitted after the switching is completed, uplink resources indicated in these PDCCHs are for the UL BWP after the switching, since TDD UL switching and TDD DL switching are performed simultaneously, such PDCCHs are also sent on the BWP2 after the switching). That is, the HARQ-ACK for the PDSCH2 after the switching also needs to be fed back in a slot n+7 according to a value of K1, then in case of the dynamic HARQ-ACK codebook, the base station may count multiple PDSCHs continuously through a C-DAI in the DCI used by the PDCCH1 and the PDCCH3, and give the total number of HARQ-ACK bits in the slot n+7 through a T-DAI, so that the HARQ-ACK for the PDSCH before the BWP switching and the HARQ-ACK for the PDSCH after the BWP switching are multiplexed in the same PUCCH for transmission. A PUCCH resource is indicated by the ARI field in the last PDCCH. Because the PDCCH3 occurs after the switching, the ARI field in the PDCCH3 indicates a PUCCH resource on the UL BWP2 after the switching, and there is no conflict with PUCCH resources of other terminals on the UL BWP2.

Third Example

Figure 9:
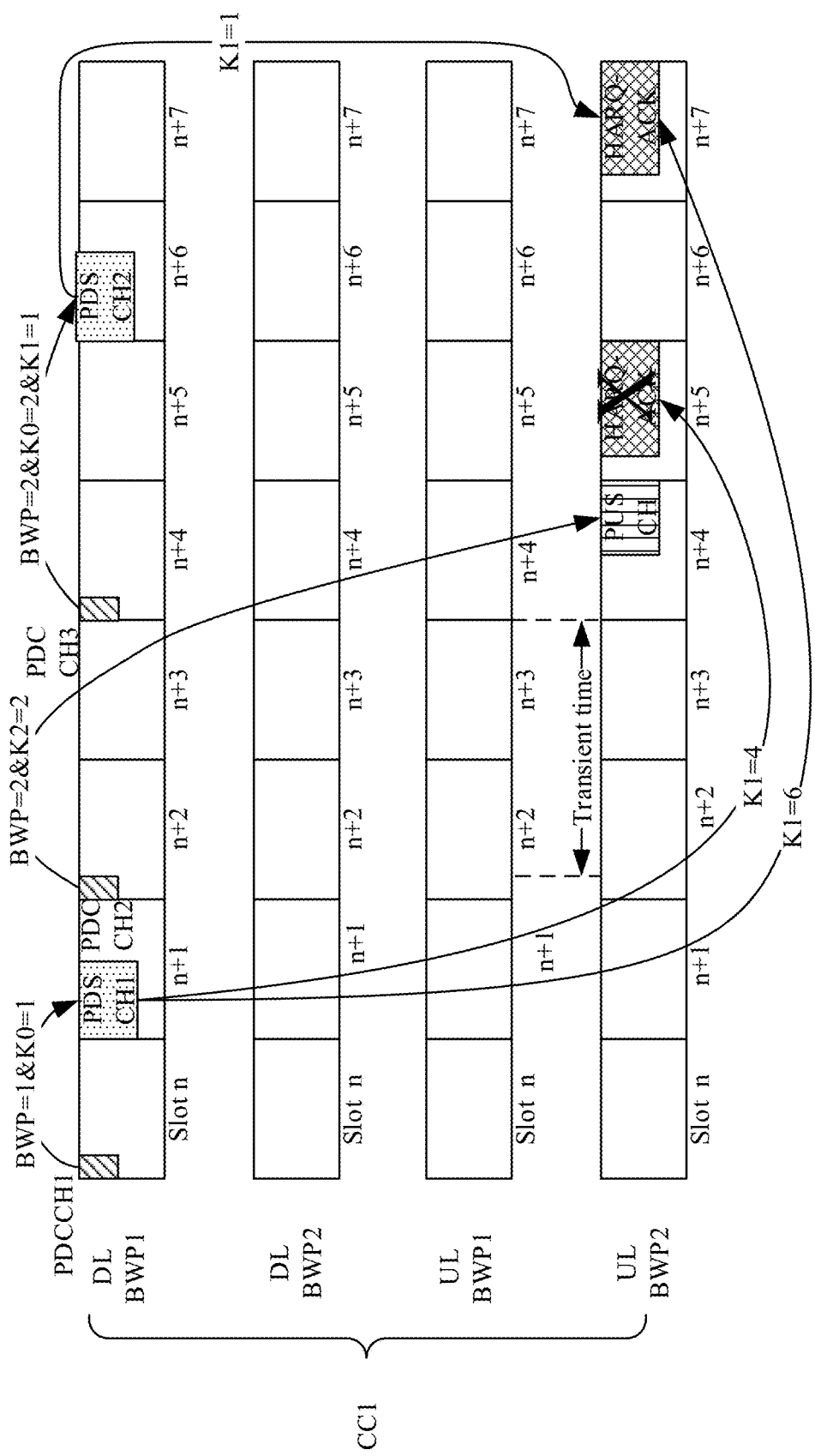
FIG. 9 shows a schematic diagram of HARQ-ACK message transmission for FDD in a third example according to some embodiments of the present disclosure.

In case of FDD, as shown in FIG. 9; assuming that CC1 is a CC transmitting a PUCCH, wherein an original activated UL BWP is BWP1, and an original activated DL BWP is also BWP1. In a slot n+2, the base station sends a PDCCH2 to schedule the terminal to receive a PUSCH in UL BWP2, i.e., the PDCCH2 is a UL grant indicating a UL BWP switching. In this case, if there is a PDSCH1, needing a HARQ-ACK to be performed after the UL BWP switching, on the activated DL BWP (i.e., BWP1) before the PDCCH2, a time-domain position of the HARQ-ACK is determined according to a value of K1 indicated in the PDCCH1 scheduling the PDSCH.

For example, when K1=4, it is determined to perform the feedback in a slot n+5 after the switching. There is no PUSCH or PUCCH resource, in this slot, scheduled by any PDCCH transmitted after the switching is completed (since the PDCCHs are transmitted after the switching point, an uplink resource indicated in these PDCCHs is directed to a UL BWP after the switching; because a FDD UL and a FDD DL are switched independently, when UL BWP switching is performed, DL BWP switching may not be performed, and transmission is still performed on DL BWP1). Therefore, if the terminal needs to transmit, in the slot n+5 on UL BWP2 after the switching, the HARQ-ACK for PDSCH1 before the switching, the terminal may only acquire a PUCCH resource according to the ARI field in the PDCCH1 scheduling the PDSCH1, but the ARI field actually indicates a PUCCH resource on the UL BWP1 before the switching, instead of a PUCCH resource on the UL BWP2 after the switching. Therefore, when transmission on the UL BWP2 is performed using a PUCCH resource on the UL BWP2 determined by the ARI field, and if the base station has allocated the PUCCH resource on the UL BWP2 to other terminals, PUCCH resources for different terminals will conflict with each other, therefore affecting HARQ-ACK transmission for each terminal. Thus, in this case, in order to avoid PUCCH resources from conflicting, the HARQ-ACK for the PDSCH1 before the switching is not transmitted through a PUCCH alone after the switching.

As another example, when K1=6, it is determined that feedback is performed in a slot n+7 after the switching, and there is a PUCCH resource, in this slot, scheduled by a PDCCH transmitted after the switching is completed (because these PDCCHs are transmitted after the switching point, uplink resources indicated in these PDCCHs are for the UL BWP after the switching; since FDD UL switching and FDD DL switching are performed independently, the DL BWP switching may not be performed when the UL BWP switching is performed, and transmission is still performed on DL BWP1). That is, the HARQ-ACK for the PDSCH2 also needs to be fed back in the slot n+7 according to a value of K1, then in case of the dynamic HARQ-ACK codebook, the base station may count multiple PDSCHs continuously through a C-DAI in the DCI used by the PDCCH1 and the PDCCH3, and give the total number of HARQ-ACK bits in the slot n+7 through a T-DAI, so that the HARQ-ACK for the PDSCH before the UL BWP switching and the HARQ-ACK for the PDSCH after the UL BWP switching are multiplexed in the same PUCCH for transmission. A PUCCH resource is indicated by the ARI field in the last PDCCH. Because the PDCCH3 occurs after the switching, the ARI field in the PDCCH3 indicates a PUCCH resource on the UL BWP2 after the switching, and there is no conflict with PUCCH resources of other terminals on the UL BWP2. In the above embodiments, if a condition that BWP switching is indicated by the UL grant is replaced with a condition that BWP switching is performed when a timer expires, the above solutions are also applicable.

Second Case

When a UL BWP switching indicated by a UL grant or triggered by a timer occurs, or when UL/DL BWP switching indicated by a DL grant or triggered by a timer occurs for TDD, a HARQ-ACK for a physical downlink channel is not transmitted through a PUCCH on a UL BWP after the switching; or the HARQ-ACK for the physical downlink channel is not transmitted through a PUCCH alone on a UL BWP after the switching; or the HARQ-ACK for the physical downlink channel is transmitted on a PUSCH on the UL BWP after the switching.

The PUSCH is specifically a PUSCH scheduled by a PDCCH indicating the UL BWP switching, or a PUSCH scheduled by a PDCCH transmitted after the PDCCH indicating the UL BWP switching.

The PUSCH is not transmitted during transient time corresponding to the switching, that is, is transmitted after the transient time.

In case of TDD, HARQ-ACK is transmitted using a dynamic HARQ-ACK codebook; in case of FDD, HARQ-ACK may be transmitted using a dynamic HARQ-ACK codebook or a semi-static HARQ-ACK codebook.

In case of FDD, UL BWP switching does not affect DL BWP switching, or in case of TDD, TDD UL BWP and TDD DL BWP switching are performed simultaneously.

A second case in which the BWP switching occurs on a carrier used to transmit a PUCCH is described by way of specific examples, see a fourth example and a fifth example.

Fourth Example

Figure 10:
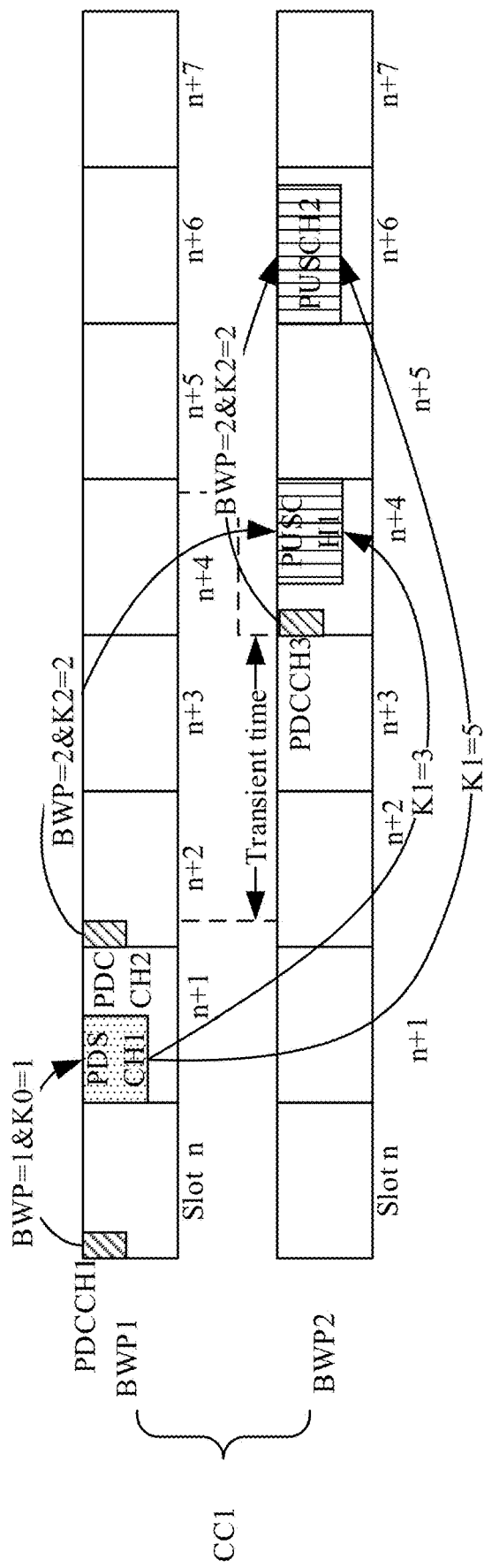
FIG. 10 shows a schematic diagram of HARQ-ACK message transmission for TDD in a fourth example according to some embodiments of the present disclosure.
Figure 11:
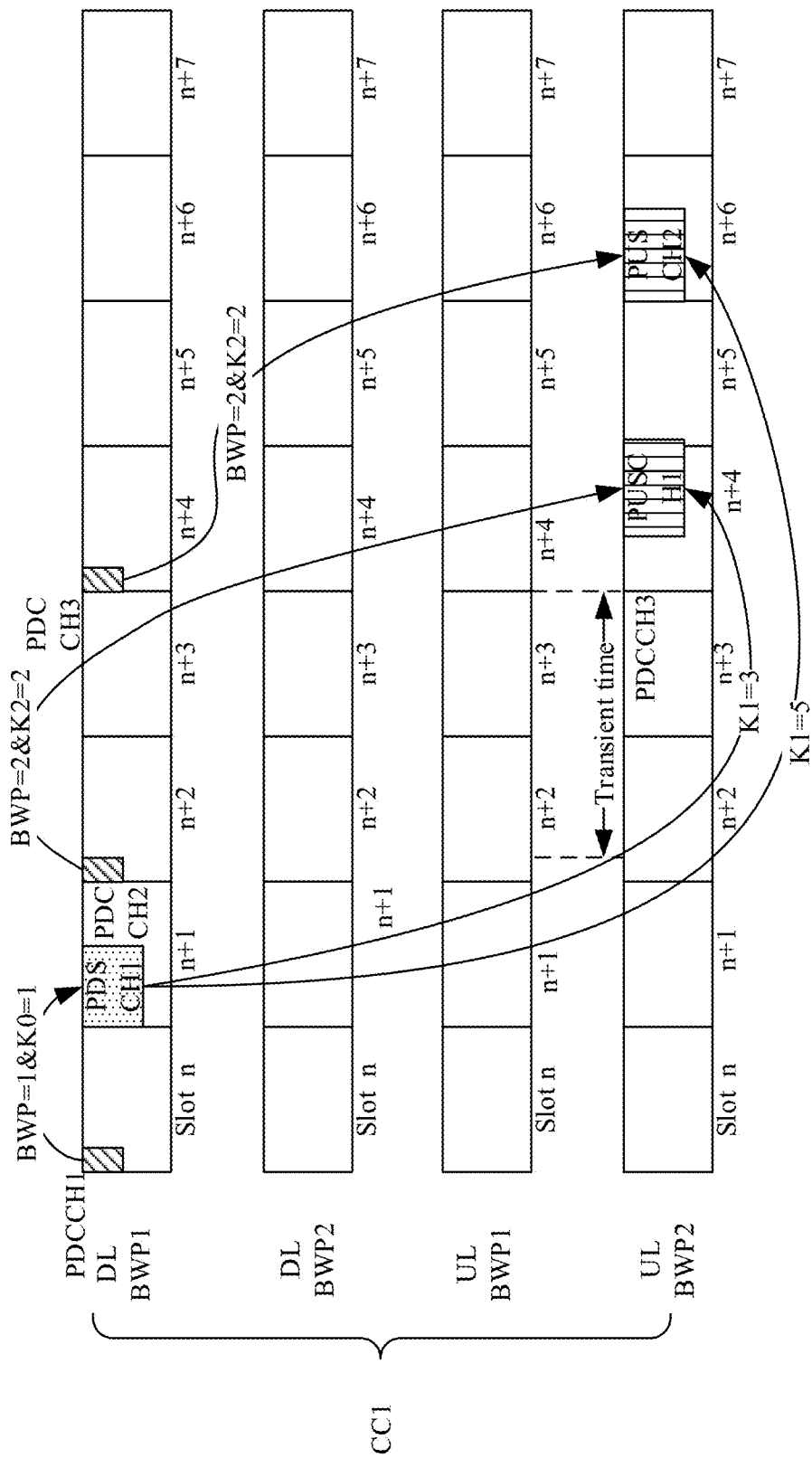
FIG. 11 shows a schematic diagram of HARQ-ACK message transmission for FDD in the fourth example of some embodiments of the present disclosure.

In case of TDD, an assumption for this example is the same as that for the second example, as shown in FIG. 10; in case of FDD, an assumption for this example is the same as that for the third example, as shown in FIG. 11.

When a K1 corresponding to PDSCH1 before the UL BWP switching is equal to 3 (K1=3), the feedback is determined to be performed in a slot n+4 after the switching. A PUSCH transmission scheduled by a PDCCH indicating the switching exists in this slot. Therefore, the HARQ-ACK for the PDSCH1 before the switching may be transmitted in a PUSCH in a slot n+4 on a UL BWP after the switching. Since a resource of the PUSCH is scheduled by the PDCCH indicating the UL BWP switching, the scheduled uplink resource is for the UL BWP after the switching. Therefore, there is no resource conflict.

When a K1 corresponding to PDSCH1 before the UL BWP switching is equal to 5 (K1=5), the feedback is determined to be performed in a slot n+6 after the switching. A PUSCH transmission scheduled by a PDCCH transmitted after the switching is completed exists in this slot. Therefore, the HARQ-ACK for the PDSCH1 before the switching may be transmitted in a PUSCH in a slot n+6 on a UL BWP after the switching. Since a resource of the PUSCH is scheduled by a PDCCH after the UL BWP switching, the scheduled uplink resource is for the UL BWP after the switching. Therefore, there is no resource conflict.

Fifth Example

Figure 12:
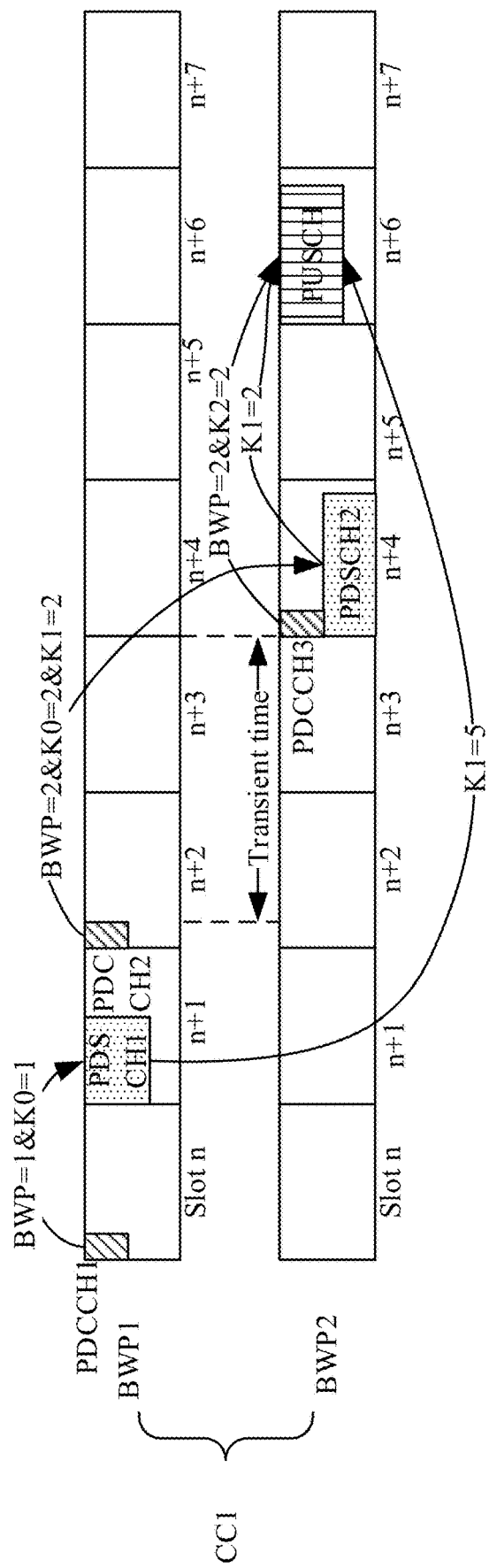
FIG. 12 shows a schematic diagram of HARQ-ACK message transmission in a fifth example according to some embodiments of the present disclosure.

In case of TDD, assuming that CC1 is a CC transmitting a PUCCH, wherein an original activated BWP is BWP1. In a slot n+2, the base station sends a PDCCH2 to schedule the terminal to receive a PDSCH in BWP2, i.e., the PDCCH2 is a DL grant indicating a UL/DL BWP switching. In this case, if there is PDSCH1, on the BWP1 before PDCCH2, needing HARQ-ACK feedback to be performed after the BWP switching, then as shown in FIG. 12, when the K1 value corresponding to the PDSCH1 before the UL BWP switching, a performing process of this case is the same as above, which is not repeated herein.

Third Case

In case of TDD, when a UL/DL BWP switching indicated by a DL grant or triggered by a timer occurs, a HARQ-ACK for a physical downlink channel is not transmitted through a PUCCH on a UL BWP after the switching; or the HARQ-ACK for the physical downlink channel is not transmitted through a PUCCH alone on a UL BWP after the switching; or the HARQ-ACK for the physical downlink channel is transmitted, on the UL BWP after the switching, on a PUCCH determined according to a HARQ-ACK resource indicator field in a PDCCH transmitted after the BWP switching is completed, or on a PUCCH determined according to a HARQ-ACK resource indicator field in a PDCCH transmitted after a point of the BWP switching. Specifically, the HARQ-ACK for the physical downlink channel and the HARQ-ACK corresponding to the PDCCH transmitted after the BWP switching is completed or the HARQ-ACK corresponding to the PDCCH transmitted after a UL BWP switching point are multiplexed on the same PUCCH for transmission.

The HARQ-ACK corresponding to the PDCCH transmitted after the BWP switching is completed or the HARQ-ACK corresponding to the PDCCH transmitted after the UL BWP switching point includes: a HARQ-ACK of a PDCCH when the PDCCH is a PDCCH indicating a release of a downlink SPS resource, a HARQ-ACK of a PDSCH when the PDCCH is used to schedule transmission of the PDSCH.

The switching point is a time point at which the UL BWP switching is determined to be performed, for example, an end position of an UL grant indicating the BWP switching is used as the switching point, or a time point at which a timer expires is used as the switching point.

HARQ-ACK is transmitted using a dynamic HARQ-ACK codebook.

The PUCCH cannot be transmitted during transient time corresponding to the switching, that is, is transmitted after the transient time.

The third case in which the BWP switching occurs on a carrier used to transmit a PUCCH is described by way of a specific example, see a sixth example.

Sixth Example

In case of TDD, as shown in FIG. 13, assuming that CC1 is a CC transmitting a PUCCH, an original activated BWP is BWP1, and a base station sends PDCCH2 in a slot n+2 to schedule the terminal to receive a PDSCH on BWP2, that is, the PDCCH2 is a DL grant indicating a UL/DL BWP switching. In this case, if there is PDSCH1, on the BWP1 before the PDCCH2, needing a HARQ-ACK feedback to be performed after the BWP switching, a time-domain position of the HARQ-ACK feedback is determined according to a K1 value indicated in the PDCCH1 scheduling the PDSCH1.

For example, when K1=4, it is determined to perform the feedback in a slot n+5 after the switching. A HARQ-ACK for the PDSCH2 scheduled by a PDCCH indicating BWP switching exists in this slot, i.e., the HARQ-ACK for the PDSCH2 also needs to be fed back in a slot n+5 according to a value of K1 after the switching, then in case of the dynamic HARQ-ACK codebook, the base station may count multiple PDSCHs continuously through a C-DAI in the DCI used by the PDCCH1 and the PDCCH2, and give the total number of HARQ-ACK bits in the slot n+5 through a T-DAI, so that the HARQ-ACK for a PDSCH before the BWP switching and the HARQ-ACK for a PDSCH after the BWP switching are multiplexed in the same PUCCH for transmission. A PUCCH resource is indicated by the ARI field in the last PDCCH. Because the PDCCH2 is used to indicate switching, the ARI field in the PDCCH2 indicates a PUCCH resource on the UL BWP2 after the switching, and there is no conflict with PUCCH resources of other terminals on the UL BWP2.

As another example, when K1=6, it is determined that feedback is performed in a slot n+7 after the switching, and there is a PUCCH resource, in this slot, scheduled by a PDCCH transmitted after the switching is completed (because these PDCCHs are transmitted after the switching is completed, uplink resources indicated in these PDCCHs are for the UL BWP after the switching, since TDD UL switching and TDD DL switching are performed simultaneously, such PDCCHs are also sent on the BWP2 after the switching). That is, the HARQ-ACK for the PDSCH3 after the switching also needs to be fed back in a slot n+7 according to a value of K1, then in case of the dynamic HARQ-ACK codebook, the base station may count multiple PDSCHs continuously through a C-DAI in the DCI used by the PDCCH1 and the PDCCH3, and give the total number of HARQ-ACK bits in the slot n+7 through a T-DAI, so that the HARQ-ACK for the PDSCH before the BWP switching and the HARQ-ACK for the PDSCH after the BWP switching are multiplexed in the same PUCCH for transmission. A PUCCH resource is indicated by the ARI field in the last PDCCH. Because the PDCCH3 occurs after the switching, the ARI field in the PDCCH3 indicates a PUCCH resource on the UL BWP2 after the switching, and there is no conflict with PUCCH resources of other terminals on the UL BWP2.

In the technical solutions of the present disclosure, the terminal may determine, according to a preset rule, whether a HARQ-ACK for a physical downlink channel may be transmitted after BWP switching, when the HARQ-ACK for the physical downlink channel received before the BWP switching needs to be fed back after the BWP switching. The terminal may determine, according to a configured condition, a condition of HARQ-ACK transmission for the physical downlink channel after the BWP switching, and may ensure a normal feedback of the HARQ-ACK for the physical downlink channel during the BWP switching, and improve a system efficiency.

The above provides an introduction of a method of transmitting a HARQ-ACK message at a terminal side. The following provides an introduction of a method of receiving a HARQ-ACK message at a base station side.

Some embodiments of the present disclosure also provide a method of receiving a Hybrid Automatic Repeat reQuest ACKnowledge (HARQ-ACK) message. As shown in FIG. 14, the method includes a step 1401.

Step 1401: if a physical downlink channel for which a HARQ-ACK needs to be fed back after Bandwidth Part (BWP) switching is transmitted to a terminal before the BWP switching, then determining, according to a preset rule, whether to receive the HARQ-ACK for the physical downlink channel after the BWP switching.

After the base station transmits, to a terminal before BWP switching, a physical downlink channel for which HARQ-ACK needs to be fed back after the BWP switching, the terminal determines, according a preset rule after the terminal receives the physical downlink channel and after the BWP switching, whether the HARQ-ACK for the physical downlink channel may be transmitted after the BWP switching. In a case that the physical downlink channel may be transmitted, the base station receives, according to a preset rule, the HARQ-ACK for the physical downlink channel transmitted after the BWP switching.

The above method ensures normal feedback of the HARQ-ACK for the physical downlink channel during BWP switching, and improves system efficiency.

The physical downlink channel includes: a physical downlink shared channel (PDSCH), or a physical downlink control channel (PDCCH) indicating release of a downlink semi-persistent scheduling (SPS) resource.

If a PDSCH needing a HARQ-ACK feedback after the BWP switching is received before the BWP switching, it may be determined, according to the preset rule, whether a HARQ-ACK for the PDSCH may be transmitted after the BWP switching; if the PDCCH indicating the release of the downlink SPS resource and needing a HARQ-ACK feedback after the BWP switching is received before the BWP switching, it may be determined, according to a preset rule, whether the HARQ-ACK for the PDCCH may be transmitted after the BWP switching.

The step of determining, according to the preset rule, whether to receive the HARQ-ACK for the physical downlink channel after the BWP switching includes: in a case that the BWP switching occurs on a carrier not used to transmit a physical uplink control channel (PUCCH), receiving the HARQ-ACK for the physical downlink channel after the BWP switching; and/or, in case of frequency division duplex (FDD), in a case that the BWP switching is DL BWP switching, receiving the HARQ-ACK for the physical downlink channel after the BWP switching.

Whether the BWP switching occurs on the carrier used to transmit a Physical Uplink Control Channel (PUCCH) may be detected first, if the BWP switching occurs on a carrier not used to transmit a PUCCH, then the HARQ-ACK for the physical downlink channel may be received after the BWP switching.

Another case is that, in case of FDD, when the BWP switching is the DL BWP switching, the HARQ-ACK for the physical downlink channel is received after the BWP switching; that is, for a FDD system, whether the DL BWP switching occurs on a carrier used to transmit a PUCCH or a carrier not used to transmit the PUCCH does not affect HARQ-ACK transmission. This is because, for the FDD, when there is only DL BWP switching, an UL BWP used to transmit the PUCCH is not changed. Therefore, whether an uplink channel transmission resource on the UL BWP is determined based on the PDCCH before the switching or the PDCCH after the switching, no conflict is generated.

The step of receiving the HARQ-ACK for the physical downlink channel after the BWP switching includes: receiving the HARQ-ACK for the physical downlink channel through a PUCCH or a physical uplink shared channel (PUSCH) on a BWP on a carrier used to transmit the PUCCH.

When the HARQ-ACK for the physical downlink channel is received after the BWP switching, the reception may be performed on one BWP on the carrier used to transmit the PUCCH, specifically, the reception may be performed through the PUCCH or a PUSCH.

In some embodiments of the present disclosure, the step of determining, according to the preset rule, whether to receive the HARQ-ACK for the physical downlink channel after the BWP switching includes: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), not receiving the HARQ-ACK for the physical downlink channel after the BWP switching, or not receiving the HARQ-ACK for the physical downlink channel through a PUCCH alone after the BWP switching, or after the BWP switching, receiving the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

When the BWP switching occurs on the carrier used to transmit a PUCCH, or if the BWP switching occurs on the carrier used to transmit a PUCCH and is FDD, the BWP switching is UL BWP switching, or if the BWP switching occurs on the carrier used to transmit a PUCCH and the carrier is TDD, a reception situation of the HARQ-ACK for the physical downlink channel after the BWP switching may include the following types: the HARQ-ACK for the physical downlink channel is not received through the PUCCH after the BWP switching; or the HARQ-ACK for the physical downlink channel is not received through the PUCCH alone after the BWP switching; or after the BWP switching, an uplink channel is determined according to the PDCCH indicating the BWP switching, or according to the PDCCH transmitted after the BWP switching is completed, or according to a PDCCH transmitted after a point of the BWP switching, the HARQ-ACK for the physical downlink channel is received on the determined uplink channel.

The uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

The HARQ-ACK for the physical downlink channel may be received on the determined uplink channel after the BWP switching, and the determined uplink channel here may be a PUCCH or a PUSCH. The PUCCH may be determined according to the HARQ-ACK resource indicator field in the PDCCH indicating the BWP switching, or may also be determined according to the HARQ-ACK resource indicator field in the PDCCH transmitted after the BWP switching is completed, or may also be determined according to the HARQ-ACK resource indicator field in PDCCH transmitted after the point of the BWP switching.

When determining the PUSCH, a PUSCH scheduled by the PDCCH indicating the BWP switching may be used as the PUSCH for transmitting the HARQ-ACK for the physical downlink channel, a PUSCH scheduled by the PDCCH transmitted after the BWP switching is completed may also be used as the PUSCH for transmitting the HARQ-ACK for the physical downlink channel, the PUSCH scheduled by the PDCCH transmitted after the point of the BWP switching may also be used as the PUSCH for transmitting the HARQ-ACK for the physical downlink channel. In such a case, it is also necessary to ensure that a HARQ-ACK may be transmitted on a PUSCH, for example, a start symbol of a PUCCH resource corresponding to the HARQ-ACK is ahead of a start symbol of the PUSCH or is aligned with a start symbol of the PUSCH.

Whether the BWP switching occurs on a carrier used to transmit a PUCCH or on a carrier not used to transmit a PUCCH, the BWP switching includes downlink (DL) BWP switching and/or uplink (UL) BWP switching.

In case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

Specifically, in case of TDD, the BWP switching includes: UL/DL BWP switching triggered by a timer or a PDCCH, wherein the UL BWP switching and the DL BWP switching in case of TDD are performed simultaneously. For Frequency-Division Duplex (FDD), the BWP switching includes: DL BWP switching and/or UL BWP switching triggered by a timer or a PDCCH indication, where the DL BWP switching may be triggered by a timer or a PDCCH carrying a DL grant, and the UL BWP switching may be triggered by a PDCCH carrying a UL grant.

When the HARQ-ACK for the physical downlink channel is transmitted after the BWP switching, the method includes: in case of TDD, transmitting the HARQ-ACK using a dynamic HARQ-ACK codebook; or, in case of FDD, when the DL BWP switching is performed, transmitting the HARQ-ACK using a dynamic HARQ-ACK codebook; or, in case of FDD, when the UL BWP switching is performed, transmitting the HARQ-ACK using a dynamic HARQ-ACK codebook or a semi-static HARQ-ACK codebook.

When transmitting the HARQ-ACK for the physical downlink channel, in case of TDD and when the DL BWP switching occurs, the HARQ-ACK is transmitted using the dynamic HARQ-ACK codebook; in case of FDD, the DL BWP switching and the UL BWP switching have different corresponding transmissions, that is, when the DL BWP switching occurs, HARQ-ACK is transmitted using a dynamic HARQ-ACK codebook; when the UL BWP switching occurs, HARQ-ACK may be transmitted using the dynamic HARQ-ACK codebook or semi-static HARQ-ACK codebook.

In the technical solutions of the present disclosure, if the base station transmits, to a terminal before BWP switching, a physical downlink channel for which HARQ-ACK needs to be fed back after the BWP switching, the base station may receive the HARQ-ACK for the physical downlink channel after the terminal determines according a preset rule the HARQ-ACK for the physical downlink channel may be transmitted after the BWP switching. Transmission of the HARQ-ACK for the physical downlink channel may be implemented, thereby ensuring a normal feedback of the HARQ-ACK for the physical downlink channel during the BWP switching, and improving a system efficiency.

It should be understood that "one embodiment" or "an embodiment" mentioned throughout the specification means that a specific feature, structure, or characteristic related to the embodiment is included in at least one embodiment of the present disclosure. Therefore, appearance of "in one embodiment" or "in an embodiment" in various places throughout the specification does not necessarily refer to the same embodiment. In addition, these specific features, structures, or characteristics may be combined in one or more embodiments in any suitable manner.

In the various embodiments of the present disclosure, it should be understood that values of sequence numbers of the following processes do not mean an order of executing the processes, and the order of executing the processes should be determined by functions and internal logic of the processes, and should not constitute any limitation on implementation processes of the embodiments of the present disclosure.

In some embodiments of the present disclosure, a base station generally refers to a base station. In the embodiments of the present disclosure, a form of the base station is not limited, and may be a macro base station (Macro Base Station), a micro base station (Pico Base Station), Node B (a name of a 3G mobile base station), and an enhanced base station (eNB), a Home enhanced base station (Femto eNB or Home eNode B or Home eNB or HeNB), a relay station, an access point, a RRU (Remote Radio Unit), a RRH (Remote Radio Head), a network side node in the 5G mobile communication system, such as a central unit (CU, Central Unit) and a distributed unit (DU, Distributed Unit), etc. The terminal may be a mobile phone (or cell phone), or other devices capable of sending or receiving wireless signals, including a user equipment (UE), a personal digital assistants (PDA), a wireless modem, a wireless communication device, a handheld device, a laptop computer, a cordless phone, a wireless local loop (WLL) station, a CPE (Customer Premise Equipment) that may convert a mobile signal into a WiFi signal, or a mobile smart hotspot, a smart home appliance, or other devices that may be spontaneous, without human operation, to communicate with mobile communication networks, etc.

Based on the above methods, some embodiments of the present disclosure also provide a device for implementing the above methods.

Figure 15:
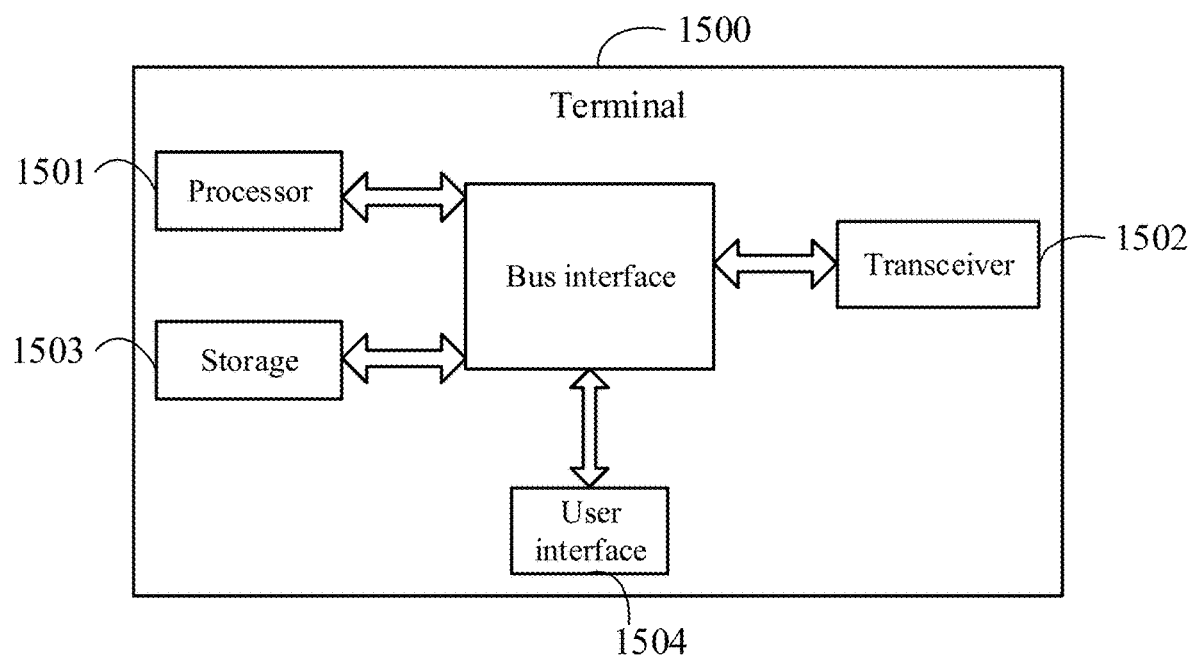
FIG. 15 is a structural schematic diagram of a terminal provided by some embodiments of the present disclosure.

Referring to FIG. 15, FIG. 15 is a structural schematic diagram of a terminal provided by some embodiments of the present disclosure. The terminal 1500 includes: a processor 1501, a transceiver 1502, a storage 1503, a user interface 1504, and a bus interface.

In some embodiments of the present disclosure, the terminal 1500 further includes: a computer program stored in the storage 1503 and executable on the processor 1501. The processor 1501 is used to read a program in the storage 1503, and execute the following processes: when a HARQ-ACK for a physical downlink channel received before Bandwidth Part (BWP) switching needs to be fed back after the BWP switching, determining, according to a preset rule, whether to transmit the HARQ-ACK for the physical downlink channel after the BWP switching.

In FIG. 15, a bus architecture may include any number of interconnected buses and bridges. Various circuits, specifically, one or more processors represented by the processor 1501 and a storage represented by the storage 1503, are linked together. The bus architecture may also link various other circuits such as peripherals, voltage regulators and power management circuits, which are well known in the art, and therefore a further description thereof is omitted herein. The bus interface provides interfaces. The transceiver 1502 may be a plurality of elements, that is, includes a transmitter and a receiver, to provide units used to communicate with various other apparatuses over a transmission medium. For different terminals, the user interface 1504 can also be an interface capable of externally/internally connecting the required devices which including but not limited to a keypad, a display, a speaker, a microphone, a joystick, and the like.

The processor 1501 is responsible for managing the bus architecture and general processing, and the storage 1503 can store data used by the processor 1501 when performing operations.

Optionally, the physical downlink channel includes: a physical downlink shared channel (PDSCH), or a physical downlink control channel (PDCCH) indicating release of a downlink semi-persistent scheduling (SPS) resource.

Optionally, the processor 1501 is further configured to perform the following steps: in a case that the BWP switching occurs on a carrier not used to transmit a physical uplink control channel (PUCCH), transmitting the HARQ-ACK for the physical downlink channel after the BWP switching through the transceiver 1502; and/or, in case of frequency division duplex (FDD), in a case that the BWP switching is DL BWP switching, transmitting the HARQ-ACK for the physical downlink channel after the BWP switching.

Optionally, the transceiver 1502 is further configured to perform the following step: transmitting the HARQ-ACK for the physical downlink channel through a PUCCH or a physical uplink shared channel (PUSCH) on a BWP on a carrier used to transmit the PUCCH.

Optionally, the processor 1501 is further configured to execute the following steps: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), performing the following by controlling the transceiver 1502: not transmitting the HARQ-ACK for the physical downlink channel through a PUCCH after the BWP switching, or not transmitting the HARQ-ACK for the physical downlink channel through a PUCCH alone after the BWP switching, or after the BWP switching, transmitting the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

Optionally, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

Optionally, the BWP switching includes downlink (DL) BWP switching and/or uplink (UL) BWP switching.

Optionally, in case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

Optionally, when the transceiver transmits HARQ-ACK for the physical downlink channel after the BWP switching, in case of TDD, the transceiver transmits the HARQ-ACK using a dynamic HARQ-ACK codebook; or, in case of FDD, when the DL BWP switching is performed, transmits the HARQ-ACK using a dynamic HARQ-ACK codebook; or, in case of FDD, when the UL BWP switching is performed, transmits the HARQ-ACK using a dynamic HARQ-ACK codebook or a semi-static HARQ-ACK codebook.

In some embodiments of the present disclosure, a computer-readable storage medium is also provided, on which a computer program is stored, and when the program is executed by a processor, the processor implements the following steps: when a HARQ-ACK for a physical downlink channel received before Bandwidth Part (BWP) switching needs to be fed back after a BWP switching, determining, according to a preset rule, whether to transmit the HARQ-ACK for the physical downlink channel after the BWP switching.

When the program is executed by the processor, all implementation manners in the above-mentioned embodiments of a transmission method applied to the terminal side may be realized. To avoid repetition, details thereof are not described here. The computer-readable storage medium in the present disclosure may be a transitory computer-readable storage medium, a non-transitory computer-readable storage medium, or a transitory computer-readable storage medium and a non-transitory computer-readable storage medium.

Figure 16:
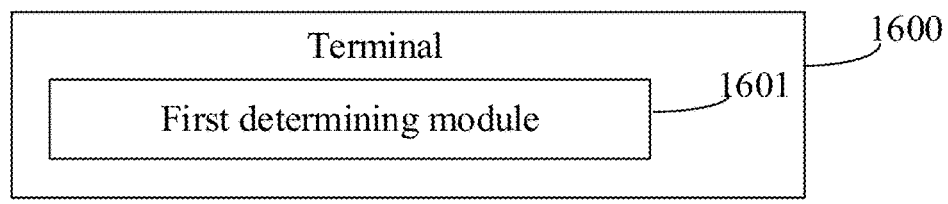
FIG. 16 is another structural schematic diagram of a terminal provided by some embodiments of the present disclosure.

Referring to FIG. 16, some embodiments of the present disclosure provide another terminal 1600. The terminal includes a first determining module 1601. The first determining module is configured to: when a HARQ-ACK for a physical downlink channel received before Bandwidth Part (BWP) switching needs to be fed back after the BWP switching, determine, according to a preset rule, whether to transmit the HARQ-ACK for the physical downlink channel after the BWP switching.

The physical downlink channel includes: a physical downlink shared channel (PDSCH), or a physical downlink control channel (PDCCH) indicating release of a downlink semi-persistent scheduling (SPS) resource.

The first determining module includes a first transmitting sub-module and/or a second transmitting sub-module.

The first transmitting sub-module is configured to: in a case that the BWP switching occurs on a carrier not used to transmit a physical uplink control channel (PUCCH), transmit the HARQ-ACK for the physical downlink channel after the BWP switching.

The second transmitting sub-module is configured to: in case of frequency division duplex (FDD), in a case that the BWP switching is DL BWP switching, transmit the HARQ-ACK for the physical downlink channel after the BWP switching.

The first transmitting sub-module is further configured to: transmit the HARQ-ACK for the physical downlink channel through a PUCCH or a physical uplink shared channel (PUSCH) on a BWP on a carrier used to transmit the PUCCH.

The first determining module is further configured to: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), not transmitting the HARQ-ACK for the physical downlink channel through a PUCCH after the BWP switching, or not transmitting the HARQ-ACK for the physical downlink channel through a PUCCH alone after the BWP switching, or after the BWP switching, transmitting the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

The uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

The BWP switching includes downlink (DL) BWP switching and/or uplink (UL) BWP switching.

In case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

When the HARQ-ACK for the physical downlink channel is transmitted after the BWP switching, in case of TDD, the HARQ-ACK is transmitted using a dynamic HARQ-ACK codebook; or, in case of FDD, when the DL BWP switching is performed, the HARQ-ACK is transmitted using a dynamic HARQ-ACK codebook; or, in case of FDD, when the UL BWP switching is performed, the HARQ-ACK is transmitted using a dynamic HARQ-ACK codebook or a semi-static HARQ-ACK codebook.

In the terminal according to some embodiments of the present disclosure, when a HARQ-ACK for a physical downlink channel received before Bandwidth Part (BWP) switching needs to be fed back after the BWP switching, the terminal determines, according to a preset rule, whether the HARQ-ACK for the physical downlink channel is transmitted after BWP switching. The terminal may determine, according to a configured condition, a condition of HARQ-ACK transmission for the physical downlink channel after the BWP switching, and may ensure a normal feedback of the HARQ-ACK for the physical downlink channel during the BWP switching, and improve a system efficiency.

Figure 17:
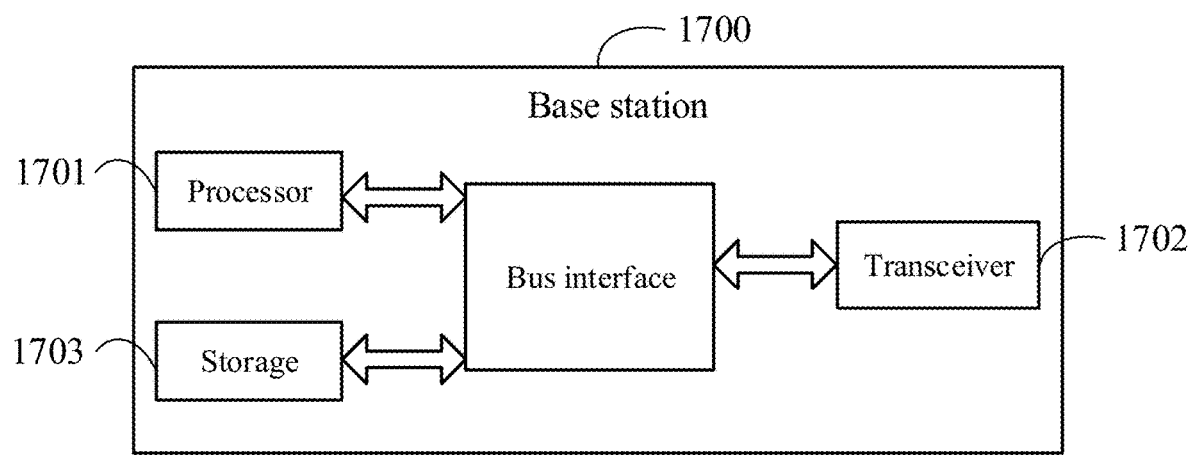
FIG. 17 is a structural schematic diagram of a base station provided by some embodiments of the present disclosure.

Referring to FIG. 17, FIG. 17 is a structural schematic diagram of a base station provided by some embodiments of the present disclosure. The base station 1700 includes: a processor 1701, a transceiver 1702, a storage 1703, and a bus interface.

In some embodiments of the present disclosure, the base station 1700 further includes: a computer program stored in the storage 1703 and executable on the processor 1701. The processor 1701 is configured to read a program in the storage 1703, and execute the following process: if a physical downlink channel for which a HARQ-ACK needs to be fed back after Bandwidth Part (BWP) switching is transmitted to a terminal before the BWP switching, determining, according to a preset rule, whether to receive the HARQ-ACK for the physical downlink channel after the BWP switching.

In FIG. 17, a bus architecture may include any number of interconnected buses and bridges. Various circuits, specifically, one or more processors represented by the processor 1701 and a storage represented by the storage 1703, are linked together. The bus architecture may also link various other circuits such as peripherals, voltage regulators and power management circuits, which are well known in the art, and therefore a further description thereof is omitted herein. The bus interface provides interfaces. The transceiver 1702 may be a plurality of elements, that is, includes a transmitter and a receiver, to provide units used to communicate with various other apparatuses over a transmission medium.

The processor 1701 is responsible for managing the bus architecture and general processing, and the storage 1703 can store data used by the processor 1701 when performing operations.

Optionally, the physical downlink channel includes: a physical downlink shared channel (PDSCH), or a physical downlink control channel (PDCCH) indicating release of a downlink semi-persistent scheduling (SPS) resource.

Optionally, the processor 1701 is further configured to perform following steps: in a case that the BWP switching occurs on a carrier not used to transmit a physical uplink control channel (PUCCH), receiving the HARQ-ACK for the physical downlink channel after the BWP switching through the transceiver 1702; and/or, in case of frequency division duplex (FDD), in a case that the BWP switching is DL BWP switching, receiving the HARQ-ACK for the physical downlink channel after the BWP switching.

Optionally, the transceiver 1702 is further configured for: receiving the HARQ-ACK for the physical downlink channel through a PUCCH or a physical uplink shared channel (PUSCH) on a BWP on a carrier used to transmit the PUCCH.

Optionally, the processor 1701 is further configured to: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), control the transceiver 1702 to not receive the HARQ-ACK for the physical downlink channel after the BWP switching, or not receive the HARQ-ACK for the physical downlink channel through a PUCCH alone after the BWP switching, or after the BWP switching, receive the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

Optionally, the uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

Optionally, the BWP switching includes downlink (DL) BWP switching and/or uplink (UL) BWP switching.

Optionally, in case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

Optionally, when the HARQ-ACK for the physical downlink channel is transmitted through the transceiver after the BWP switching, in case of TDD, the HARQ-ACK is transmitted using a dynamic HARQ-ACK codebook; or, in case of FDD, when the DL BWP switching is performed, the HARQ-ACK is transmitted using a dynamic HARQ-ACK codebook; or, in case of FDD, when the UL BWP switching is performed, the HARQ-ACK is transmitted using a dynamic HARQ-ACK codebook or a semi-static HARQ-ACK codebook.

In some embodiments of the present disclosure, a computer-readable storage medium is also provided, on which a computer program is stored, and when the program is executed by a processor, the processor implements the following step: if a physical downlink channel for which a HARQ-ACK needs to be fed back after Bandwidth Part (BWP) switching is transmitted to a terminal before the BWP switching, determining, according to a preset rule, whether to receive the HARQ-ACK for the physical downlink channel after the BWP switching.

When the program is executed by the processor, all implementation manners in the above-mentioned embodiments of a transmission method applied to the base station side may be realized. To avoid repetition, details thereof are not described here. The computer-readable storage medium in the present disclosure may be a transitory computer-readable storage medium, a non-transitory computer-readable storage medium, or a transitory computer-readable storage medium and a non-transitory computer-readable storage medium.

Figure 18:
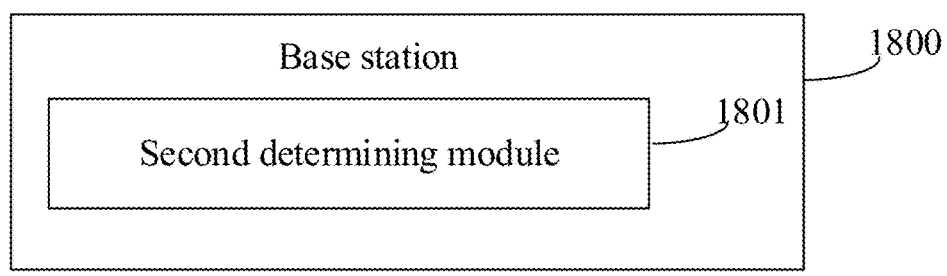
FIG. 18 is another structural schematic diagram of a base station provided by some embodiments of the present disclosure.

Referring to FIG. 18, some embodiments of the present disclosure provide another structure of a base station 1800. As shown in FIG. 18, the base station 1800 includes a second determining module 1801.

The second determining module 1801 is configured to: if a physical downlink channel for which a HARQ-ACK needs to be fed back after Bandwidth Part (BWP) switching is transmitted to a terminal before the BWP switching, determine, according to a preset rule, whether to receive the HARQ-ACK for the physical downlink channel after the BWP switching.

The physical downlink channel includes: a physical downlink shared channel (PDSCH), or a physical downlink control channel (PDCCH) indicating release of a downlink semi-persistent scheduling (SPS) resource.

The second determining module includes a first receiving sub-module and/or a second receiving sub-module. The first receiving sub-module is configured to: in a case that the BWP switching occurs on a carrier not used to transmit a physical uplink control channel (PUCCH), receive the HARQ-ACK for the physical downlink channel after the BWP switching. The second receiving sub-module is configured to: in case of frequency division duplex (FDD), in a case that the BWP switching is DL BWP switching, receive the HARQ-ACK for the physical downlink channel after the BWP switching.

The first receiving sub-module is further configured to: receive the HARQ-ACK for the physical downlink channel through a PUCCH or a physical uplink shared channel (PUSCH) on a BWP on a carrier used to transmit the PUCCH.

The second determining module is further configured to: when the BWP switching occurs on the carrier used to transmit a PUCCH, or when the BWP switching occurs on the carrier used to transmit a PUCCH and the BWP switching is UL BWP switching in case of FDD or when the BWP switching occurs on the carrier used to transmit a PUCCH and is time division duplex (TDD), not receive the HARQ-ACK for the physical downlink channel after the BWP switching, or not receive the HARQ-ACK for the physical downlink channel through a PUCCH alone after the BWP switching, or after the BWP switching, receive the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching.

The uplink channel determined according to the PDCCH indicating the BWP switching, or according to the PDCCH transmitted after the BWP switching is completed, or according to the PDCCH transmitted after the point of the BWP switching includes: a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

Optionally, the BWP switching includes downlink (DL) BWP switching and/or uplink (UL) BWP switching.

Optionally, in case of time division duplex (TDD), the BWP switching includes: UL BWP switching and DL BWP switching triggered by a timer or triggered by a PDCCH carrying an uplink grant (UL grant) or a downlink grant (DL grant); or, in case of frequency division duplex (FDD), the BWP switching includes: DL BWP switching triggered by a timer or DL BWP switching triggered by a PDCCH carrying a DL grant and/or UL BWP switching triggered by a PDCCH carrying a UL grant.

Optionally, when the HARQ-ACK for the physical downlink channel is transmitted after the BWP switching, in case of TDD, the HARQ-ACK is transmitted using a dynamic HARQ-ACK codebook; or, in case of FDD, when the DL BWP switching is performed, the HARQ-ACK is transmitted using a dynamic HARQ-ACK codebook; or, in case of FDD, when the UL BWP switching is performed, the HARQ-ACK is transmitted using a dynamic HARQ-ACK codebook or a semi-static HARQ-ACK codebook.

In some embodiments of the present disclosure, if a physical downlink channel for which HARQ-ACK needs to be fed back after BWP switching is transmitted to a terminal before the BWP switching, the HARQ-ACK for the physical downlink channel transmitted by the terminal may be received after the terminal determines according a preset rule the HARQ-ACK for the physical downlink channel may be transmitted after the BWP switching. Transmission of the HARQ-ACK for the physical downlink channel may be implemented, thereby ensuring a normal feedback of the HARQ-ACK for the physical downlink channel during the BWP switching, and improving a system efficiency.

A person of ordinary skill in the art may be aware that units and algorithm steps of examples described in combination with the embodiments disclosed herein may be implemented by electronic hardware or a combination of computer software and electronic hardware. Whether these functions are executed by hardware or software depends on a specific application and design constraint conditions of the technical solutions. Professionals and technicians may use different methods for each specific application to implement the described functions, but such implementation should not be considered to go beyond the scope of the present disclosure.

Those skilled in the art may clearly understand that, for convenience and conciseness of description, a specific working process of the above-described system, device, and unit may be obtained by referring to a corresponding process in the foregoing method embodiments, which will not be repeated here.

In the embodiments provided in the present application, it should be understood that the disclosed device and method may be implemented in other ways. For example, the device embodiments described above are only illustrative. For example, a division of the units is only a logical functional division, and there may be other divisions in actual implementation, for example, multiple units or components may be combined or may be integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and components displayed as units may or may not be physical units, that is, may be located in one place, or they may be distributed on multiple network units. Some or all of the units may be selected according to actual needs to achieve the objectives of some embodiments of the present disclosure.

In addition, functional units in the various embodiments of the present disclosure may be integrated into one processing unit, or each unit may exist alone physically, or two or more units may be integrated into one unit.

If the function is implemented in the form of a software functional unit and sold or used as an independent product, the function may be stored in a computer readable storage medium. Based on this understanding, the technical solutions of the present disclosure essentially or a part of the technical solutions that contributes to the related art or the part of the technical solutions may be embodied in the form of a software product. The computer software product is stored in a storage medium, including several instructions used to make a computer device (which may be a personal computer, a server, or a base station, etc.) execute all or part of the steps of the methods of the various embodiments of the present disclosure. The aforementioned storage media include: a USB disk, a removable hard disk, a ROM, a RAM, a magnetic disk or an optical disk and other media that may store program codes.

The above are optional implementations of the present disclosure. It should be pointed out that for those of ordinary skill in the art, several improvements and modifications may be made without departing from the principles of the present disclosure, and these improvements and modifications are also within the protection scope of the present disclosure.

What is claimed is:

1. A method of transmitting a Hybrid Automatic Repeat reQuest ACKnowledge (HARQ-ACK) message, comprising:
   when a physical downlink channel is received before Bandwidth Part (BWP) switching and HARQ-ACK for the physical downlink channel needs to be fed back after the BWP switching, determining, according to a preset rule, whether to transmit the HARQ-ACK for the physical downlink channel after the BWP switching, wherein determining, according to the preset rule, whether to transmit the HARQ-ACK for the physical downlink channel after the BWP switching comprises at least one of following 1), 2), or 3):

1) In a case that the BWP switching occurs on a carrier not used to transmit a physical uplink control channel (PUCCH), transmitting the HARQ-ACK for the physical downlink channel after the BWP switching;

2) in case of paired spectrum, in a case that the BWP switching is downlink (DL) BWP switching, transmitting the HARQ-ACK for the physical downlink channel after the BWP switching; or 3) when the BWP switching occurs on a carrier used to transmit a physical uplink control channel (PUCCH), or when the BWP switching occurs on a carrier used to transmit a PUCCH and the BWP switching is uplink (UL) BWP switching in case of paired spectrum, or when the BWP switching occurs on a carrier used to transmit a PUCCH in case of unpaired spectrum, not transmitting the HARQ-ACK for the physical downlink channel through a PUCCH after the BWP switching, or not transmitting the HARQ-ACK for the physical downlink channel through a PUCCH alone after the BWP switching, or after the BWP switching, transmitting the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching, wherein, in a case that the BWP switching occurs on a carrier not used to transmit a PUCCH, or in case of paired spectrum and in a case that the BWP switching is DL BWP switching, transmitting the HARQ-ACK for the physical downlink channel after the BWP switching comprises:

transmitting the HARQ-ACK for the physical downlink channel through a PUCCH or a physical uplink shared channel (PUSCH) on a BWP on a carrier used to transmit the PUCCH;

and/or, when the BWP switching occurs on a carrier used to transmit a PUCCH, or when the BWP switching occurs on a carrier used to transmit a PUCCH and the BWP switching is UL BWP switching in case of paired spectrum, or when the BWP switching occurs on a carrier used to transmit a PUCCH in case of unpaired spectrum, the uplink channel determined according to the PDCCH indicating the BWP switching, or according to the PDCCH transmitted after the BWP switching is completed, or according to the PDCCH transmitted after the point of the BWP switching comprises:

a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

2. The method according to claim 1, wherein the BWP switching comprises downlink (DL) BWP switching and/or uplink (UL) BWP switching;

or, in case of unpaired spectrum, the BWP switching comprises: uplink (UL) BWP switching and downlink (DL) BWP switching, wherein both the UL BWP switching and the DL BWP switching are triggered by a timer or triggered by a PDCCH carrying a UL grant or a DL grant; or, in case of paired spectrum, the BWP switching comprises: DL BWP switching and/or UL BWP switching, wherein the DL BWP switching is triggered by a timer or triggered by a PDCCH carrying a DL grant, the UL BWP switching is triggered by a PDCCH carrying a UL grant.

3. The method according to claim 1, wherein when the HARQ-ACK for the physical downlink channel is transmitted after the BWP switching, the method further comprises:

in case of unpaired spectrum, transmitting the HARQ-ACK using a dynamic HARQ-ACK codebook; or, in case of paired spectrum, when DL BWP switching is performed, transmitting the HARQ-ACK using a dynamic HARQ-ACK codebook; or, in case of paired spectrum, when UL BWP switching is performed, transmitting the HARQ-ACK using a dynamic HARQ-ACK codebook or a semi-static HARQ-ACK codebook.

4. A method of transmitting a Hybrid Automatic Repeat reQuest ACKnowledge (HARQ-ACK) message, comprising:

when a physical downlink channel is transmitted to a terminal before Bandwidth Part (BWP) switching and a HARQ-ACK for the physical downlink channel needs to be fed back after the BWP switching, determining, according to a preset rule, whether to receive the HARQ-ACK for the physical downlink channel after the BWP switching, wherein determining, according to the preset rule, whether to receive the HARQ-ACK for the physical downlink channel after the BWP switching comprises at least one of following 1), 2), or 3):

1) In a case that the BWP switching occurs on a carrier not used to transmit a physical uplink control channel (PUCCH), receiving the HARQ-ACK for the physical downlink channel after the BWP switching;

2) in case of paired spectrum, in a case that the BWP switching is downlink (DL) BWP switching, receiving the HARQ-ACK for the physical downlink channel after the BWP switching; or 3) when the BWP switching occurs on a carrier used to transmit a PUCCH, or when the BWP switching occurs on a carrier used to transmit a PUCCH and the BWP switching is uplink (UL) BWP switching in case of paired spectrum, or when the BWP switching occurs on a carrier used to transmit a PUCCH in case of unpaired spectrum, not receiving the HARQ-ACK for the physical downlink channel after the BWP switching, or not receiving the HARQ-ACK for the physical downlink channel through a PUCCH alone after the BWP switching, or after the BWP switching, receiving the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching, wherein, in a case that the BWP switching occurs on a carrier not used to transmit a PUCCH, or in case of paired spectrum and in a case that the BWP switching is DL BWP switching, receiving the HARQ-ACK for the physical downlink channel after the BWP switching comprises:

receiving the HARQ-ACK for the physical downlink channel through a PUCCH or a physical uplink shared channel (PUSCH) on a BWP on a carrier used to transmit the PUCCH; and/or, when the BWP switching occurs on a carrier used to transmit a PUCCH, or when the BWP switching occurs on a carrier used to transmit a PUCCH and the BWP switching is UL BWP switching in case of paired spectrum, or when the BWP switching occurs on a carrier used to transmit a PUCCH in case of unpaired spectrum, the uplink channel determined according to the PDCCH indicating the BWP switching, or according to the PDCCH transmitted after the BWP switching is completed, or according to the PDCCH transmitted after the point of the BWP switching comprises:

a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or, a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

5. The method according to claim 4, wherein the BWP switching comprises downlink (DL) BWP switching and/or uplink (UL) BWP switching;

or, in case of unpaired spectrum, the BWP switching comprises: uplink (UL) BWP switching and downlink (DL) BWP switching, wherein both the UL BWP switching and the DL BWP switching are triggered by a timer or triggered by a PDCCH carrying a UL grant or a DL grant; or, in case of paired spectrum, the BWP switching comprises: DL BWP switching triggered by a timer or DL BWP switching triggered by a PDCCH carrying a DL grant and/or UL BWP switching triggered by a PDCCH carrying a UL grant.

6. The method according to claim 4, wherein when the HARQ-ACK for the physical downlink channel is transmitted after the BWP switching, in case of unpaired spectrum, the HARQ-ACK is transmitted using a dynamic HARQ-ACK codebook; or, in case of paired spectrum, when DL BWP switching is performed, the HARQ-ACK is transmitted using a dynamic HARQ-ACK codebook; or, in case of paired spectrum, when UL BWP switching is performed, the HARQ-ACK is transmitted using a dynamic HARQ-ACK codebook or a semi-static HARQ-ACK codebook.

7. A terminal, comprising:

a transceiver, a storage, a processor, and a computer program stored on the storage and executable on the processor, wherein when the processor executes the computer program, the processor following steps:

when a physical downlink channel is received before Bandwidth Part (BWP) switching and a Hybrid Automatic Repeat reQuest ACKnowledge (HARQ-ACK) for the physical downlink channel needs to be fed back after the BWP switching, determining, according to a preset rule, whether to transmit the HARQ-ACK for the physical downlink channel after the BWP switching, wherein the processor is further configured to perform at least one of following steps 1), 2), or 3):

1) In a case that the BWP switching occurs on a carrier not used to transmit a physical uplink control channel (PUCCH), transmitting the HARQ-ACK for the physical downlink channel after the BWP switching through the transceiver;

2) in case of paired spectrum, in a case that the BWP switching is downlink (DL) BWP switching, transmitting the HARQ-ACK for the physical downlink channel after the BWP switching; or 3) when the BWP switching occurs on a carrier used to transmit a physical uplink control channel (PUCCH), or when the BWP switching occurs on a carrier used to transmit a PUCCH and the BWP switching is uplink (UL) BWP switching in case of paired spectrum, or when the BWP switching occurs on a carrier used to transmit a PUCCH in case of unpaired spectrum, controlling the transceiver to not transmit the HARQ-ACK for the physical downlink channel through a PUCCH after the BWP switching, or not transmit the HARQ-ACK for the physical downlink channel through a PUCCH alone after the BWP switching, or after the BWP switching, transmit the HARQ-ACK for the physical downlink channel on an uplink channel determined according to a PDCCH indicating the BWP switching, or according to a PDCCH transmitted after the BWP switching is completed, or according to a PDCCH transmitted after a point of the BWP switching, wherein, in a case that the BWP switching occurs on a carrier not used to transmit a PUCCH, or in case of paired spectrum and in a case that the BWP switching is downlink (DL) BWP switching, the transceiver is further configured to perform the following steps:

transmitting the HARQ-ACK for the physical downlink channel through a PUCCH or a physical uplink shared channel (PUSCH) on a BWP on a carrier used to transmit the PUCCH; and/or when the BWP switching occurs on a carrier used to transmit a PUCCH, or when the BWP switching occurs on a carrier used to transmit a PUCCH and the BWP switching is UL BWP switching in case of paired spectrum, or when the BWP switching occurs on a carrier used to transmit a PUCCH in case of unpaired spectrum, the uplink channel determined according to the PDCCH indicating the BWP switching, or according to the PDCCH transmitted after the BWP switching is completed, or according to the PDCCH transmitted after the point of the BWP switching comprises:
- a PUCCH determined according to a HARQ-ACK resource indicator field in the PDCCH indicating the BWP switching, or a PUCCH determined according to the HARQ-ACK resource indicator field in the PDCCH transmitted after the BWP switching is completed, or a PUCCH determined by the HARQ-ACK resource indicator field in the PDCCH transmitted after the point of the BWP switching; or,
- a PUSCH scheduled by the PDCCH indicating the BWP switching, or a PUSCH scheduled by the PDCCH transmitted after the BWP switching is completed, or a PUSCH scheduled by the PDCCH transmitted after the point of the BWP switching.

8. The terminal according to claim 7, wherein the BWP switching comprises downlink (DL) BWP switching and/or uplink (UL) BWP switching, or
   in case of unpaired spectrum, the BWP switching comprises: uplink (UL) BWP switching and downlink (DL) BWP switching, wherein both the UL BWP switching and the DL BWP switching are triggered by a timer or triggered by a PDCCH carrying a UL grant or a DL grant; or,
   in case of paired spectrum, the BWP switching comprises: DL BWP switching and/or UL BWP switching, wherein the DL BWP switching is triggered by a timer or triggered by a PDCCH carrying a DL grant, the UL BWP switching is triggered by a PDCCH carrying a UL grant.

9. The terminal according to claim 7, wherein, when the HARQ-ACK for the physical downlink channel is transmitted after the BWP switching through the transceiver,
   in case of unpaired spectrum, the HARQ-ACK is transmitted using a dynamic HARQ-ACK codebook; or,
   in case of paired spectrum, when DL BWP switching is performed, the HARQ-ACK is transmitted using a dynamic HARQ-ACK codebook; or,
   in case of paired spectrum, when UL BWP switching is performed, the HARQ-ACK is transmitted using a dynamic HARQ-ACK codebook or a semi-static HARQ-ACK codebook.

10. A base station, comprising:
    a transceiver, a storage, a processor, and a computer program stored on the storage and executable on the processor, wherein when the processor executes the computer program, the processor following steps in the method of transmitting a HARQ-ACK message according to claim 4.

11. The base station according to claim 10, wherein the BWP switching comprises downlink (DL) BWP switching and/or uplink (UL) BWP switching; or,
    in case of unpaired spectrum, the BWP switching comprises: uplink (UL) BWP switching and downlink (DL) BWP switching, wherein both the UL BWP switching and the DL BWP switching are triggered by a timer or triggered by a PDCCH carrying a UL grant or a DL grant; or,
    in case of paired spectrum, the BWP switching comprises: DL BWP switching and/or UL BWP switching, wherein the DL BWP switching is triggered by a timer or triggered by a PDCCH carrying a DL grant, the UL BWP switching is triggered by a PDCCH carrying a UL grant.

12. The base station according to claim 10, wherein, when the HARQ-ACK for the physical downlink channel is transmitted after the BWP switching through the transceiver,
    in case of unpaired spectrum, the HARQ-ACK is transmitted using a dynamic HARQ-ACK codebook; or,
    in case of paired spectrum, when DL BWP switching is performed, the HARQ-ACK is transmitted using a dynamic HARQ-ACK codebook; or,
    in case of paired spectrum, when UL BWP switching is performed, the HARQ-ACK is transmitted using a dynamic HARQ-ACK codebook or a semi-static HARQ-ACK codebook.

\* \* \* \* \*